United States Patent
Falconetti et al.

(10) Patent No.: US 9,467,210 B2
(45) Date of Patent: Oct. 11, 2016

(54) TRANSMISSION PARAMETER ADAPTATION IN COOPERATIVE SIGNAL COMMUNICATION

(75) Inventors: Laetitia Falconetti, Aachen (DE); Christian Hoymann, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1012 days.

(21) Appl. No.: 13/266,813

(22) PCT Filed: Apr. 28, 2009

(86) PCT No.: PCT/EP2009/055153
§ 371 (c)(1),
(2), (4) Date: Jul. 19, 2012

(87) PCT Pub. No.: WO2010/124725
PCT Pub. Date: Nov. 4, 2010

(65) Prior Publication Data
US 2012/0302172 A1 Nov. 29, 2012

(51) Int. Cl.
*H04B 17/00* (2015.01)
*H04B 7/02* (2006.01)
*H04W 52/24* (2009.01)
*H04W 52/40* (2009.01)
*H04W 24/00* (2009.01)
*H04W 28/18* (2009.01)
*H04W 72/08* (2009.01)

(52) U.S. Cl.
CPC ............ *H04B 7/024* (2013.01); *H04W 52/24* (2013.01); *H04W 52/40* (2013.01); *H04W 24/00* (2013.01); *H04W 28/18* (2013.01); *H04W 72/085* (2013.01)

(58) Field of Classification Search
CPC . H04W 36/18; H04W 36/30; H04W 84/045; H04W 52/40; H04W 88/08; H04W 36/0083; H04W 36/0055
USPC ........................................................ 455/67.11
See application file for complete search history.

(56) References Cited

U.S. PATENT DOCUMENTS 7,194,280 B2   3/2007   Vanghi
8,135,337 B2   3/2012   Larsson (Continued)

FOREIGN PATENT DOCUMENTS

CN   1457617 A   11/2003
CN   1669242 A   9/2005

(Continued)

OTHER PUBLICATIONS

3rd Generation Partnership Project. "Collaborative MIMO for LTE-A Downlink." 3GPP TSG RAN WG1 Meeting #53bis, R1-082501, Warsaw, Poland, Jun. 30-Jul. 4, 2008.
3GPP. "Uplink macro-diversity for E-UTRA—Further Results" TSG-RAN WG1, San Diego, CA. Oct. 2005. R1-051183. 3GPP, Sophia Antipolis, France.

*Primary Examiner* — Ajibola Akinyemi
(74) *Attorney, Agent, or Firm* — Coats & Bennett, P.L.L.C.

(57) ABSTRACT

With respect to cooperative signal communication between a mobile terminal (200) and a plurality of access nodes (100-1, 100-2), a combined signal quality value is calculated on the basis of a first individual signal quality value (Q1) of a communication link between a first access node (100-1), e.g. a serving base station, and the terminal (200), and a second individual signal quality value (Q2) of a second communication link between a second access node (100-2), e.g. a supporting base station, and the terminal (200). On the basis of the combined signal quality value, a transmission parameter (50) for future cooperative transmissions is adapted. The transmission parameter (50) may be a modulation scheme, a coding scheme, a transmit power, or a resource allocation.

36 Claims, 11 Drawing Sheets

(56) References Cited

U.S. PATENT DOCUMENTS

| | | |
|---|---|---|
| 2002/0114291 A1 | 8/2002 | Moulsey et al. |
| 2002/0155854 A1 | 10/2002 | Vanghi |
| 2007/0280168 A1 | 12/2007 | Shibata |
| 2008/0254749 A1 | 10/2008 | Ashkenazi et al. |
| 2008/0274692 A1 | 11/2008 | Larsson |
| 2009/0111473 A1* | 4/2009 | Tao ............... H04W 36/18 455/440 |
| 2009/0124261 A1* | 5/2009 | Shimomura ....... H04W 72/082 455/436 |
| 2010/0110967 A1* | 5/2010 | Sartori ............. H04B 7/2606 370/315 |
| 2011/0263271 A1 | 10/2011 | Hoymann et al. |

FOREIGN PATENT DOCUMENTS

| | | |
|---|---|---|
| CN | 101083805 A | 12/2007 |
| CN | 101222299 A | 7/2008 |
| CN | 101286818 A | 10/2008 |
| CN | 101322327 A | 12/2008 |
| CN | 101394253 A | 3/2009 |
| EP | 1924009 A1 | 5/2008 |

* cited by examiner

| Rx Type \ ΔPG | ΔPG < 5 dB | 5 dB ≤ ΔPG < 10dB | 10 dB ≤ ΔPG < 20dB | 20 dB ≤ ΔPG |
|---|---|---|---|---|
| Basic Rx | 3 dB | 2 dB | 1 dB | 0 dB |
| Advanced Rx | 4 dB | 3 dB | 2 dB | 0 dB |

FIG. 10

| Rx Type \ ΔPG | ΔPG < 5 dB | 5 dB ≤ ΔPG < 10dB | 10 dB ≤ ΔPG |
|---|---|---|---|
| Basic Rx | 2 dB | 1 dB | 0 dB |
| Advanced Rx | 3 dB | 2 dB | 0 dB |

FIG. 11

TRANSMISSION PARAMETER ADAPTATION IN COOPERATIVE SIGNAL COMMUNICATION

TECHNICAL FIELD

The present invention relates to techniques for transmission parameter adaptation in cooperative signal transmission.

BACKGROUND

Cellular systems in general suffer from co-channel interference. For example, simultaneous transmissions may use the same physical resources and thus generate mutual interference. This co-channel interference reduces the signal quality, which may be measured as signal to interference plus noise ratio (SINR). The reduced signal quality in turn reduces the system capacity.

Future wireless networks, e.g. $3^{rd}$ Generation Partnership Project Long Term Evolution (3GPP LTE) and 3GPP LTE Advanced, with a more dense deployment of access nodes, e.g. base stations (BSs), or with a higher density of users will most probably remain interference-limited.

There exist proposals to use an approach of cooperative signal communication, e.g. in 3GPP LTE Advanced which refers thereto as cooperative multipoint transmission and reception (COMP). In this approach, receive (Rx) signals are collected from a plurality of BSs for implementing uplink (UL) cooperation, and transmit (Tx) signals are transmitted from a plurality of BSs for implementing downlink (DL) cooperation.

In UL cooperation, several receiving access nodes, e.g., base stations (BSs) or remote radio heads (RRHs), receive a signal from a mobile terminal, also referred to as user equipment (UE), thereby obtaining multiple Rx signals from the terminal. The Rx signals are then communicated between access nodes and jointly processed, e.g. at a central node or at a serving BS.

In DL cooperation, a central node or a serving BS distributes a Tx signal to several transmitting access nodes, e.g. BSs or RRHs. The transmitting access nodes jointly transmit the signal to the terminal.

In both cooperation scenarios, signals may be processed, i.e. by joint reception in UL or joint pre-coding in DL, at a central node or at a serving access node so that co-channel interference is mitigated. Furthermore, the cooperative signal reception or transmission may increase the carrier signal strength.

Cooperation between access nodes allows for increasing the Rx signal quality, in UL cooperation at one of the access nodes and in DL cooperation at the terminal, and capacity of an access link between the terminal and the access nodes.

Soft handover techniques considered in 3GPP for UMTS (Universal Mobile Telecommunications System) Terrestrial Radio Access (UTRA) can be considered as a type of UL cooperation between access nodes. In these soft handover techniques, the signal transmitted by the terminal is received in multiple cells, also referred to as active set, thereby obtaining multiple Rx signals. The multiple Rx signals are then combined in a central node, referred to as Radio Network Controller (RNC), according to selection combining.

Further, several adaptation techniques are known, which may be used to address issues like quickly varying channel conditions and interference level. For example, it is known to adapt a Modulation and Coding Scheme (MCS), to adapt the Tx power, or to change the resource allocation in time and frequency domain. Such adaptation techniques may be implemented, e.g. in a serving BS. However, these known adaptation techniques do not take into account cooperative signal communication scenarios.

For example, the parameters for an UL transmission like MCS, Tx power or resource allocation may be selected based on an Rx signal quality value of a communication link between a terminal and its serving BS. Cooperative signal communication increases the UL Rx signal quality by leveraging the multiple channels from the terminal to a plurality of BSs. The improved cooperative Rx signal quality will thus not be taken into account when adapting the parameters for UL transmission. Further, the type of cooperative signal communication may vary frequently. As a result, the cooperative Rx signal quality varies frequently depending on the type of cooperative signal communication. By simply considering the last signal quality measurement or an average over the last measurements, it is therefore not possible to quantify the future cooperative Rx signal quality and to use it for adaptation. Consequently, the potential of cooperative signal communication will not be fully exploited.

Accordingly, there is a need for techniques that overcome the aforementioned problems and allow for efficiently utilizing cooperative signal communication in a communication network.

SUMMARY

It is an object of the present invention to meet the above need. This is achieved by methods and devices according to the independent claims. The dependent claims define further embodiments of the invention.

According to an aspect of the invention, a method of cooperative signal communication is provided. According to the method, a signal quality value is calculated on the basis of a first individual signal quality value of a first communication link between a first access node and a mobile terminal and on the basis of a second individual signal quality value of a second communication link between a second access node and the mobile terminal. On the basis of the calculated signal quality value, a transmission parameter is set. The transmission parameter is to be used for cooperative communication of a signal between the mobile terminal and the first and second access nodes.

According to a further aspect of the invention, a computer program to be executed by a processor of an access node is provided. The computer program comprises code adapted to execute the steps of the above method.

According to a further aspect of the invention, a device is provided. The device comprises a processor. The processor is configured to calculate a signal quality value on the basis of a first individual signal quality value of a first communication link between a first access node and a mobile terminal and on the basis of a second individual signal quality value of a second communication link between a second access node and the mobile terminal. In addition, the processor is configured to set, on the basis of the calculated signal quality value, a transmission parameter to be used for cooperative communication of a signal between the mobile terminal and the first and second access nodes.

According to a further aspect of the invention, a network system is provided. The network system comprises a first access node and a second access node. The first access node comprises a wireless interface configured to communicate a signal with a mobile terminal on a first communication link.

The second access node comprises a wireless interface configured to communicate the signal with the mobile terminal on a second communication link. The first access node further comprises a processor. The processor is configured to calculate a signal quality value on the basis of a first individual signal quality value of the first communication link and on the basis of a second individual signal quality value of the second communication link. In addition the processor is configured to set, on the basis of the calculated signal quality value, a transmission parameter to be used for cooperative communication of a signal between the mobile terminal and the first and second access nodes.

BRIEF DESCRIPTION OF THE DRAWINGS

FIG. 10 shows an example of a look-up table to be used in transmission parameter adaptation according to an embodiment of the invention.

FIG. 11 shows a further example of a look-up table to be used in transmission parameter adaptation according to an embodiment of the invention.

DETAILED DESCRIPTION OF EMBODIMENTS

Figure 1:
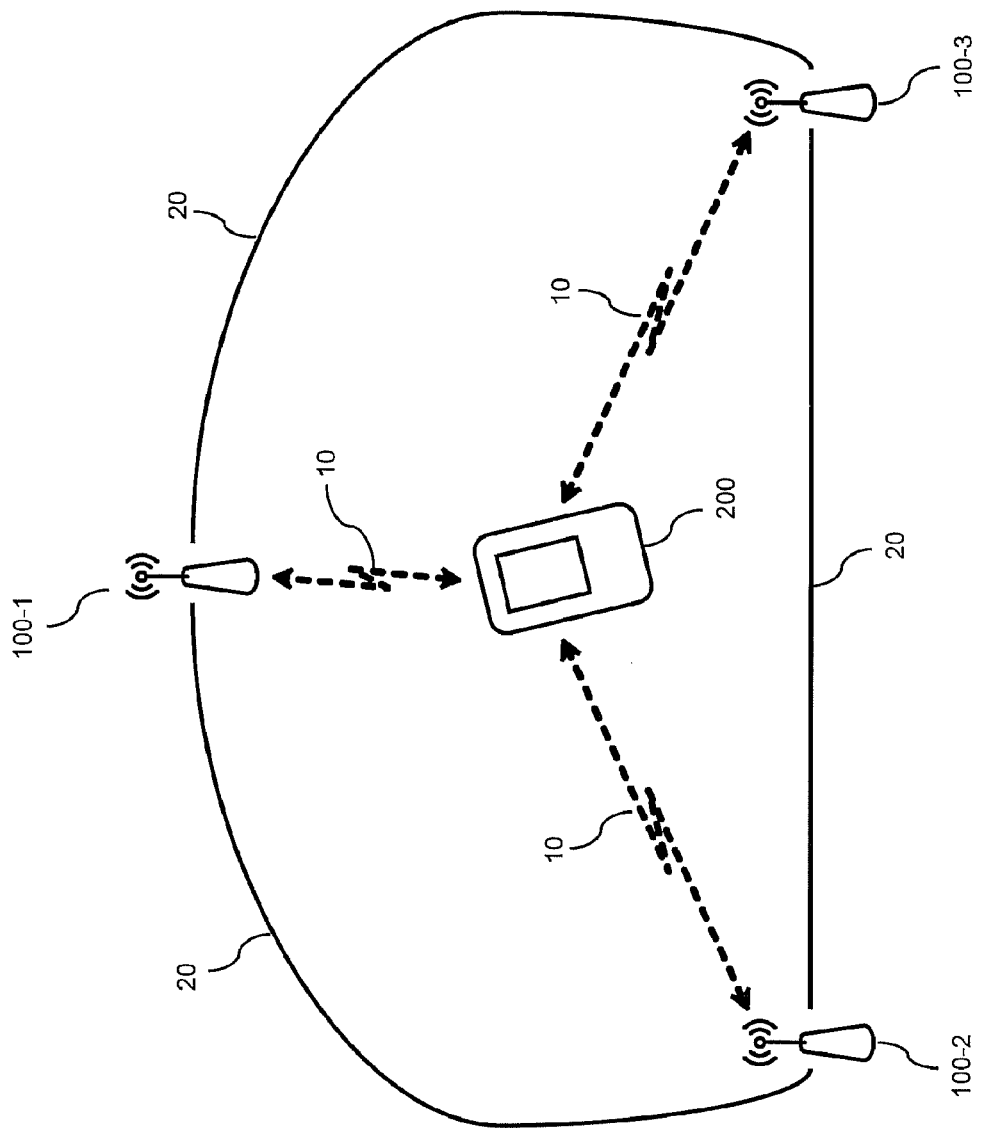
FIG. 1 schematically illustrates a communication network environment in which concepts according to embodiments of the present invention can be applied.

In the following, the invention will be explained in more detail by referring to exemplary embodiments which relate to methods, devices and computer programs for cooperative signal transmission.

According to these embodiments, concepts are proposed which allow to efficiently use transmission parameter adaptation in connection with cooperative signal communication. According to some embodiments, a serving access node, e.g. a serving BS or a section of a serving BS, may accurately take into consideration the increased Rx signal quality due to cooperation when setting a transmission parameter, such as modulation scheme, a coding scheme, a Tx power, and/or a resource allocation in the frequency domain and/or in the time domain. The transmission parameter or parameters may then be used for the next cooperative signal transmission, which may be in the UL direction or in the DL direction. Using these concepts, a target quality of service, e.g. characterized by a target residual block error value, can be met with more aggressive transmission parameters, which in turn may be utilized to obtain a higher throughput in a cell of the serving access node and a lower interference to adjacent cells.

For example, selecting a robust modulation scheme and/or coding scheme, or selecting a high Tx power may help to cope with unfavorable channel conditions. In other situations, e.g. in the case of good channel quality, a more aggressive modulation scheme and/or coding scheme may improve the achieved data rate or may be used to ensure the same quality of service with a reduced Tx power. Further, in some systems with flexible frequency resource allocation, e.g. systems according to 3GPP LTE, the individual signal quality values may be obtained in a frequency-dependent manner, e.g. by obtaining the individual signal quality values for different parts of the system bandwidth. It is then possible to schedule a transmission to or from a terminal in a frequency part where good combined channel conditions are experienced, or to avoid the frequency parts with unfavorable combined channel conditions.

An access node can be embodied in a BS or a section of a BS. Further, an access node may also be an e-Node-B (eNB). A section of a BS may be regarded as a unit to cover a cell area of a cellular radio frequency (RF) communication network. Such a unit typically comprises one or more antennas, RF-parts such as filters and power-amplifiers or low-noise amplifiers, and signal processing means. Cooperative signal communication may be achieved via at least two access nodes, e.g. a first BS and a second BS and/or a first section of a first BS and a second section of the same BS or of a second BS. BS-to-BS-cooperation may be also denoted as inter-base-station cooperation or inter-eNB cooperation and section-to-section-cooperation of the same BS also as intra-base-station cooperation or intra-eNB cooperation.

In the description of the following embodiments, the terms "access node" and "base station" are used in a synonymous manner. This has been done for legibility and illustrative reasons and is not meant to exclude section-to-section cooperation, be it with the same or between different base stations, from being applicable to the following embodiments.

According to some embodiments, UL cooperation of access nodes is implemented. In UL cooperation, an access node, e.g. a BS or a section of a BS, receives a UL signal from a terminal and may also pre-process the UL signal. The received UL signal is communicated to a central node and/or to another access node, e.g. a serving BS of the terminal or another section of the same BS, for joint detection and/or joint decoding. In this process, the UL signal may be communicated as samples in the time domain, as In-Phase/Quadrature (IQ) samples in the frequency domain, as soft values of coded or uncoded bits, or as coded or uncoded bits, i.e. hard bits.

According to some embodiments, DL cooperation of access nodes is implemented. In DL cooperation, a central node or an access node, e.g. a serving BS or a section of a BS, pre-processes data intended for a terminal, thereby generating a DL signal to be transmitted to the terminal. The DL signal is communicated to one or more further access nodes, e.g. supporting BSs or other sections of the same BS, to be cooperatively transmitted to the terminal. In this process, the DL signal may be communicated as samples in the time domain, or as IQ samples in the frequency domain.

According to some embodiments, UL cooperation and DL cooperation may be combined.

In the following, embodiments of the present invention will be explained in more detail by referring to the accompanying drawings. FIG. 1 shows a mobile communication network environment, in which concepts according to embodiments of the present invention may be applied. For example, the mobile communication network environment may be an LTE network. The mobile communication network environment comprises a plurality of access nodes 100-1, 100-2, 100-3 and a mobile terminal 200. In the following, it will be assumed that the access nodes 100-1, 100-2, 100-3 are BSs of the communication network. However, it is to be understood that the concepts described herein could also be applied to other types of access nodes, e.g. to different sections of the same BS. The terminal 200 may be a mobile phone, a portable computer or other type of UE. In the following the terminal will thus also be referred to as UE.

The BSs 100-1, 100-2, 100-3 may cooperatively communicate with the terminal 200 by transmitting, i.e. sending or receiving, a signal 10 on different communication paths, i.e. a first wireless communication link between the BS 100-1 and the terminal 200, a second wireless communication link between the BS 100-2 and the terminal 200, and a third wireless communication link between the BS 100-3 and the terminal 200. One of the BSs, e.g. the BS 100-1, may be a serving BS, and the other BSs, e.g. the BSs 100-2, 100-3, may be supporting BSs.

Cooperative reception of the signal 10 by at least two of the BSs 100-1, 100-2, 100-3 may also be referred to as UL cooperation, whereas cooperative transmission of the signal 10 from at least two of the BSs 100-1, 100-2, 100-3 may also be referred to as DL cooperation.

For cooperative reception of the signal 10, the BSs 100-1, 100-2, 100-3 exchange information concerning individual Rx signals from the terminal 200, e.g. the supporting BS 100-2 may communicate information relating to the Rx signal from the terminal 200 to the serving BS 100-1, and the supporting BS 100-3 may communicate information relating to the Rx signal from the terminal 200 to the serving BS 100-1. For this purpose, the BSs 100-1, 100-2, 100-3 exchange cooperation signals 20, e.g. on a transport link, sometimes also referred to as backhaul.

For cooperative transmission of the signal 10, the BSs 100-1, 100-2, 100-3 exchange information concerning Tx signals intended for the terminal 200, e.g. the serving BS 100-1 may communicate information relating to the Tx signal for the terminal 200 to the supporting BS 100-2 and to the supporting BS 100-3. Again, this is accomplished by the BSs 100-1, 100-2, 100-3 exchanging cooperation signals 20. The serving base station 100-1 and the supporting base stations 100-2, 100-3 may then jointly transmit the Tx signal to the terminal 200.

Different types of cooperation signals 20 can be exchanged. In the case of UL cooperation, an Rx signal received by the supporting BS 100-2, 100-3 may be communicated to the serving BS 100-1, e.g. in the form of complex baseband signals, e.g. IQ samples which optionally may be compressed, or residual complex baseband signals where already detected streams are cancelled out. The Rx signals may also be communicated in the form of coded or uncoded bits or as soft values of coded or uncoded bits, in each case either compressed or uncompressed. Soft values of coded bits may be generated by a demodulator of the supporting BS 100-2, 100-3. Soft values of uncoded bits may be generated in a convolutional decoder of a turbo decoder in the supporting BS 100-2, 100-3. In the case of DL cooperation, a Tx signal to be transmitted to the terminal 200 can be communicated from the serving BS 100-1 to the supporting BSs 100-2, 100-3, e.g. in the form of a complex baseband signal, e.g. IQ samples or time-domain samples which optionally may be compressed.

It is to be understood that an arbitrary number of BSs could participate in the cooperative signal communication. For example, there could be only one supporting BS or there could be two, three, four or more supporting BSs. Further, the BSs 100-1, 100-2, 100-3, and the terminal may operate in a cooperative mode, in which the signal 10 is cooperatively communicated on the communication path between the terminal 200 and the serving BS 100-1 and on at least one further communication path between the terminal 200 and respective supporting BSs 100-2, 100-3, or in non-cooperative mode, in which the signal 10 is communicated between the terminal 200 and only the serving BS 100-1. In UL cooperation, the cooperative mode may also be referred to as cooperative point-to-multipoint (co-PTM) mode. In DL cooperation, the cooperative mode may also be referred to as cooperative multipoint-to-point (co-MTP) mode.

Figure 2:
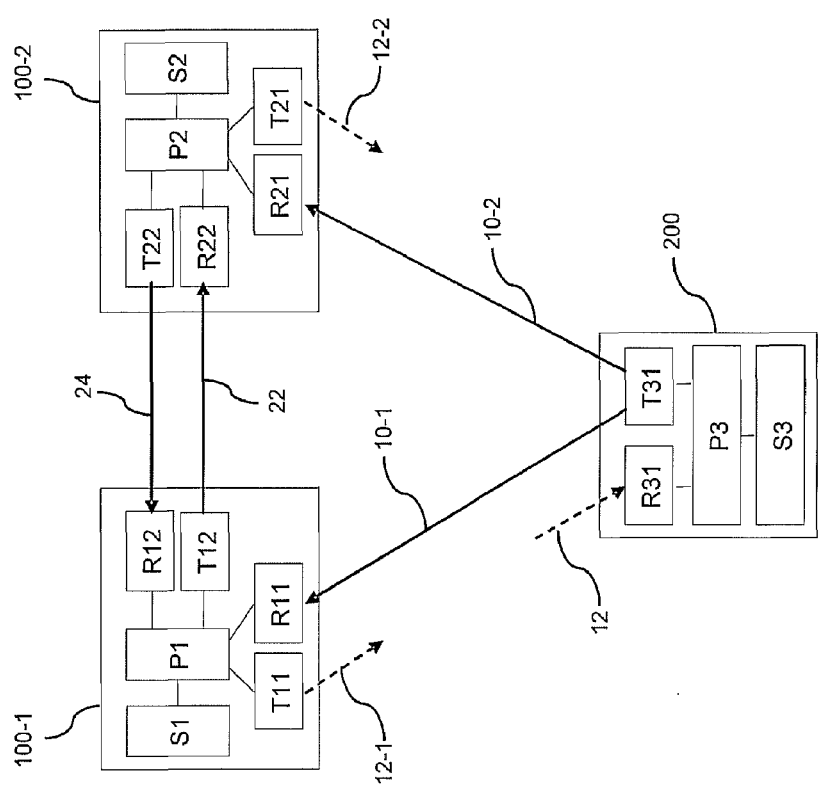
FIG. 2 schematically illustrates an implementation of devices in a communication network according to an embodiment of the invention.

FIG. 2 schematically illustrates an exemplary implementation of devices according to an embodiment of the invention which relates to cooperation of access nodes with distributed control. The access nodes may be BSs or other types of access nodes, e.g. different sections of the same BS. Further, FIG. 2 also illustrates communication between these devices. In FIG. 2, elements which are similar to those of FIG. 1 have been designated with the same reference signs. Additional information concerning these elements can thus be obtained from the above explanations in connection with FIG. 1.

In FIG. 2, a serving access node 100-1, e.g. a serving BS, a supporting access node 100-2, e.g. a supporting BS, and a terminal or UE 200 are depicted. In the following, the serving access node 100-1 may also be referred to as first access node or first BS, and the supporting access node 100-2 may also be referred to as second access node or second BS. The supporting access node 100-2 may have been selected for a cooperation with the serving access node 100-1 so as to improve or optimize the signal reception or transmission with respect to the terminal 200, e.g. according to one or more selection criteria.

For illustrative reasons, further one or more possible supporting access nodes, which may be selected or not, or further one or more access nodes that do not qualify at all for support, e.g. because there exists no link between the serving access node and these one or more further access nodes, are not depicted. Further possible terminals which could be associated to the access nodes 100-1, 100-2 or to any further access node are not depicted as well.

Further, it should be noted that an access node, e.g. one of the access nodes 100-1, 100-2, can be a serving access node for a particular terminal while it is a supporting access node for another terminal. If the terminal moves and a further access node takes over the role of the serving access node, the previous serving access node may take over the role of a supporting node or may not be considered anymore for cooperation.

The individual devices 100-1, 100-2, 200 each comprise one or more sub-units with a sub-unit starting with T denoting a transmission unit or transmitter, a sub-unit starting with R denoting a receiving unit or receiver, a sub-unit starting with P denoting a processing unit or processor, and a sub-unit starting with S denoting a storage unit or memory.

The terminal 200 comprises a transmission unit T31 for sending a signal 10-1 to the serving access node 100-1 and a signal 10-2 to the supporting access node 100-2. In practice, the signals 10-1 and 10-2 are typically transmitted by the terminal 200, i.e. the transmission unit T31, as one Tx signal only. Further, the terminal comprises a receiving unit R31 for receiving an Rx signal 12, e.g. from the serving access node 100-1 or from the supporting access node 100-2 as illustrated by the dashed arrows.

Due to a, typically non-directive, antenna of the terminal 200 and the channel characteristics the Tx signal is received by the serving access node 100-1 as the Rx signal 10-1 and by the supporting access node 100-2 as the Rx signal 10-2. Due to similar considerations, the Rx signal 12 may be a superposition of a Tx signal 12-1 from the serving BS 100-1 and a Tx signal 12-2 from the supporting access node 100-2. In addition, the terminal 200 comprises a processing unit P3 for processing information and messages, and a storage unit S3 for storing and retrieving information.

The serving access node 100-1 comprises a receiving unit R11, and the supporting access node 100-2 comprises a receiving unit R21, for receiving the signal 10-1 and 10-2, respectively, from the terminal 200. Here it is to be understood that the receiving units R11, R21 may also be used for receiving signals from further terminals not shown here. Further, the serving access node 100-1 comprises a transmission unit T11, to transmit the Tx signal 12-1 to the terminal 200, and the supporting access node 100-2 comprises a transmission unit T21, to transmit the Tx signal 12-2 to the terminal 200. It is to be understood that the transmission units T11, T21 may also be used for transmitting signals to further terminals not shown here. The receiving unit R11 and the transmission unit T11 implement a wireless interface of the serving access node 100-1 with respect to the terminal 200. Similarly, the receiving unit R21 and the transmission unit T21 implement a wireless interface of the supporting access node 100-2 with respect to the terminal 200.

As further illustrated, the serving access node 100-1 comprises a processor P1, and a storage unit S1. Similarly, the supporting access node 100-2 comprises a processing unit P2 and a storage unit S2. The access nodes 100-1, 100-2 may thus be provided with a processing capability for processing the exchanged and received information and/or with storage capability for storing data.

In addition, the serving access node 100-1 comprises a transmission unit T12 for transmitting signals to other access nodes, e.g. to the supporting access node 100-2, and a receiving unit R12 for receiving signals from other access nodes, e.g. from the supporting access node 100-2. Similarly, the supporting access node 100-2 comprises a transmission unit T22 for transmitting signals to other access nodes, e.g. to the serving access node 100-1, and a receiving unit R22 for receiving signals from other access nodes, e.g. from the serving access node 100-1. The transmission unit T12 and the receiving unit R12 thus provide an interface of the serving access node 100-1 with respect to other access nodes, e.g. the supporting access node 100-2, and the transmission unit T22 and the receiving unit R22 thus provide an interface of the supporting access node 100-2 with respect to other access nodes, e.g. the serving access node 100-1.

The transmission unit T12 and the receiving unit R22 may be connected directly, e.g. by a wired connection such as via a cable or via the backplane of a server rack, or indirectly, e.g. through any wireless or wired transport network with intermediate switching and/or routing nodes. Similarly, the transmission unit T22 and the receiving unit R12 may be connected directly, e.g. with a cable, or indirectly, e.g. through any wireless or wired transport network with intermediate switching and/or routing nodes.

Accordingly, the serving access node 100-1 and the supporting access node 100-2 may communicate via dedicated physical connection, e.g. cable or fiber, directly connecting the serving access node 100-1 and the supporting access node 100-2. According to another example, the serving access node 100-1 and the supporting access node 100-2 may communicate via a switched or routed communication network with intermediate switching or routing nodes. An example for an interconnection of access nodes suitable for implementing the concepts as described herein is the interface X2 according to the 3GPP LTE specification, which is an IP-based interface being independent of the underlying transport network.

The receiving units R11 and R12 may use different communication technologies, e.g. for communicating with the terminal 200, via the transmission unit T31, a wireless communication technique such as LTE may be used, and for communicating with the supporting access node 100-2, via the transmission unit T22, a wired communication technique may be used, such as Ethernet. The same applies to the transmission units T11 and T12 as well as to the corresponding units R21 and R22 or T21 and T22 of the supporting access node 100-2. However, implementations are conceivable wherein receiving units R11 and R12 may be of the same communication technology, e.g. both wireless, or even be combined into one receiving unit. The same may apply to the transmission units T11 and T12 as well as to the corresponding sub-units of the supporting access node 100-2, i.e. the receiving units R21 and R22 or the transmission units T21 and T22. A receiving unit and a corresponding transmission unit in the same device, such as the receiving unit R11 and the transmission unit T11, the receiving unit R12 and the transmission unit T12, the receiving unit R21 and the transmission unit T21, the receiving unit R22 and the transmission unit T22, or the receiving unit R31 and the transmission unit T31, may be combined in a transceiving unit or transceiver.

In UL cooperation, the serving access node 100-1 can request information relating to the Rx signal 10-2 from the supporting access node 100-2 using its transmission unit T12, e.g. by sending a UL cooperation request message 22 to the supporting access node 100-2. The UL cooperation request message 22 may have the form of a request for a limited number of responses, or may be a subscription to receive responses until an unscubscribe message is sent. The first case may be referred to as request-response mechanism, and the second case may be referred to as subscribe-publish mechanism.

The supporting access node 100-2 receives the signal 10-2 via its receiving unit R21. The information may be the Rx signal 10-2 in a format as defined in the request, e.g. IQ samples in the frequency domain, samples in the time domain, soft values of coded or uncoded bits, or hard values of coded or uncoded bits. The processing unit P2 is adapted to obtain the requested information from the Rx signal 10-2. The supporting access node 100-2 can send the requested information via its transmission unit T22 to the receiving unit R12 of the serving access node 100-1, e.g. in a response message 24. In the case of a subscribe-publish mechanism, the response message may also be referred to as a publish message. The processing unit P1 of the serving access node is adapted to determine an improved or optimized Rx signal from the terminal, which is accomplished on the basis on the requested information as received from the supporting access node 100-2 and on corresponding information relating to the signal 10-1, which is received by the serving access node 100-1 itself.

In DL cooperation, the serving access node 100-1 may send information relating to the signal 12-2 to be transmitted from the supporting access node 100-2 using its transmission unit T12, e.g. in a DL cooperation request message 22. The information may be the Tx signal 12-2 in a specific format, e.g. IQ samples in the frequency domain, or samples in the time domain. On the basis of the information received from the serving access node 100-1, the supporting access node 100-2 sends the signal 12-2 to the terminal 200.

Figure 3:
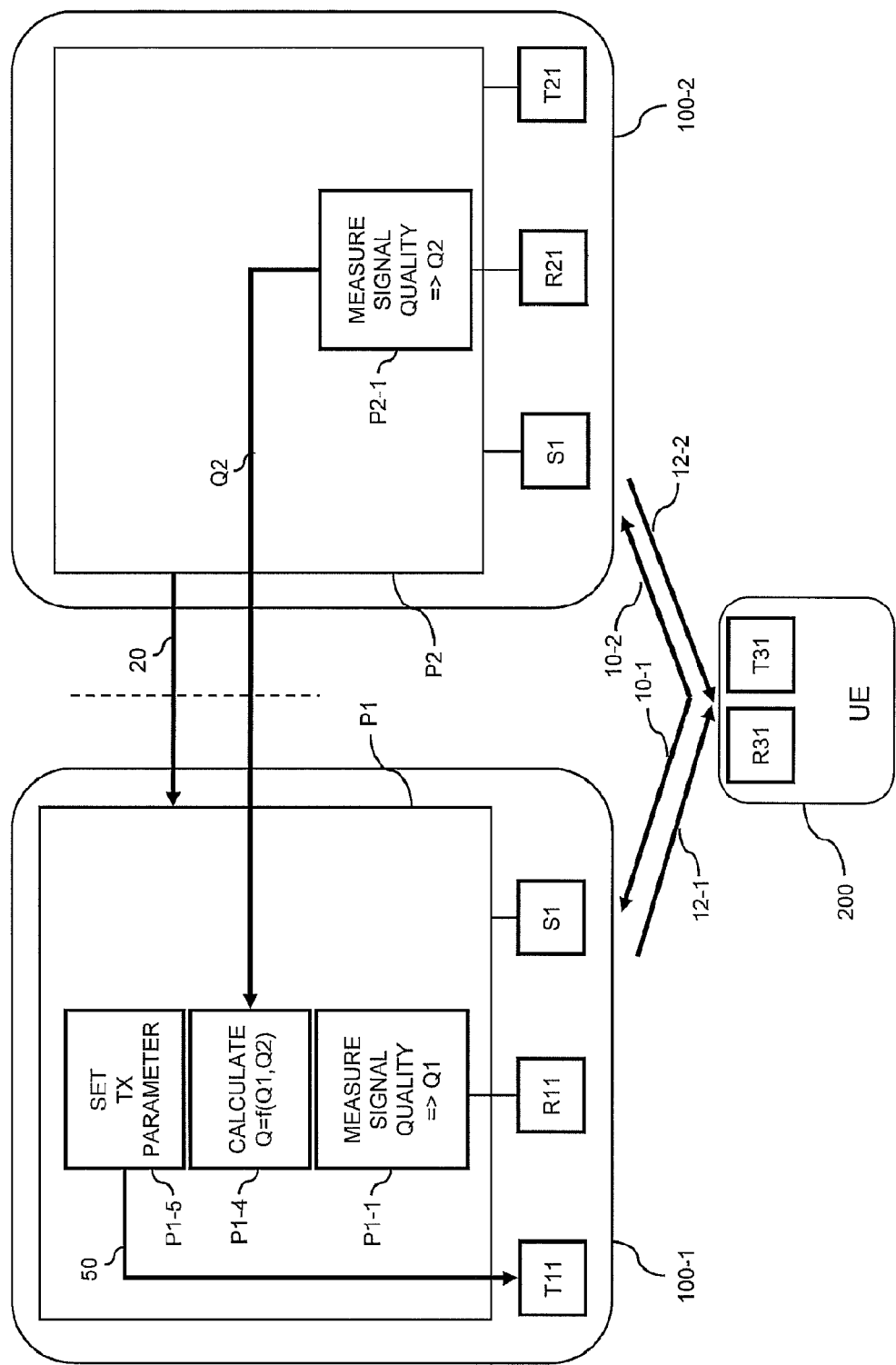
FIG. 3 schematically illustrates components in devices according to embodiments of the invention.

The DL cooperation request message 22 may thus comprise cooperation signals communicated from the serving access node 100-1 to the supporting access node 100-2. Further details concerning the DL cooperation request message 22 are explained below. Similarly, the response message 24 may comprise cooperation signals communicated from the supporting access node 100-2 to the serving access node. FIG. 3 schematically illustrates devices according to an embodiment of the invention, which relates to transmission parameter adaptation for UL cooperative signal communication. In FIG. 3, elements which correspond to those as shown in FIGS. 1 and 2 have been designated with the same reference signs. Further details concerning these elements can thus be obtained from the corresponding explanations in connection with FIGS. 1 and 2. In FIG. 3 components and functions of the serving access node 100-1, of the supporting access node 100-2, and of the terminal 200 are further illustrated, which participate in a process of transmission parameter adaptation for UL cooperative signal communication according to an embodiment of the invention.

As already explained above, in UL cooperation, the receiving unit R11 of the serving access node 100-1 receives the Rx signal 10-1, and the receiving unit R21 of the supporting BS 100-2 receives the Rx signal 10-2. The Rx signal 10-1 and the Rx signal 10-2 are transmitted as a single Tx signal from the terminal 200. Further, in order to perform cooperative signal reception, a cooperation signal 20 is communicated from the supporting access node 100-2 to the serving access node. The cooperation signal 20 may represent the Rx signal 10-2 in the form of samples, e.g. frequency domain IQ samples or time-domain samples, in the form of soft values of coded or uncoded bits, or in the form of hard values of coded or uncoded bits.

The processing unit P1 of the serving access node 100-1 is configured to measure a first signal quality value Q1 of the Rx signal 10-1. This accomplished by a measuring function P1-1 of the processing unit P1. Similarly, the processing unit P2 of the supporting access node 100-2 is configured to measure a second signal quality value Q2 of the Rx signal 10-2. This accomplished by a measuring function P2-1 of the processing unit P2. Since the first and second signal quality values Q1, Q2 each pertain to a respective Rx signal, they are also referred to as individual signal quality values. The first individual signal quality value Q1 and/or the second individual frequency value may be frequency dependent.

The supporting access node 100-2 then communicates the measured second signal quality value Q2 to the serving access node 100-1, where it is received by a calculating function P1-4 of the processing unit P1. Communicating the second signal quality value Q2 from the supporting access node 100-2 to the serving access node is accomplished by an inter-access node interface, schematically illustrated by a dashed vertical line. As explained in connection with FIG. 2, the inter-access node interface may be implemented by the receiving units R12, R22 and the transmission units T12, T22. However, it is to be understood that only the transmission unit T22 and the receiving unit R12 are actually needed to communicate the second signal quality value Q2 from the supporting access node 100-2 to the serving access node 100-1.

The calculating function P1-4 then calculates a signal quality value Q which is a function f(Q1, Q2) of the first individual signal quality value Q1 and of the second individual signal quality value Q2. In other words, the signal quality value Q is calculated on the basis of the first individual signal quality value Q1 and on the basis of the second individual signal quality value Q2. Since the signal quality value Q reflects characteristics of several Rx signals, it may also be referred to as combined signal quality value.

Different ways are possible for calculating the signal value Q.

According to some embodiments, the first individual signal quality value Q1, the second individual signal quality value Q2, and the calculated signal quality value Q each correspond to a received signal strength value. In this case, the signal quality value Q is a calculated received signal strength value $RSS_{calc}$. Similarly, the first individual signal quality value is a first individual received signal strength value $RSS_1$, and the second individual signal quality value is a second individual received signal strength value $RSS_2$.

According to one option, the combined received signal strength value $RSS_{calc}$ may be calculated according to:

$$RSS_{calc} = \text{Max}(RSS_1, RSS_2). \quad (1)$$

That is to say, the maximum value of individual received signal strength values is selected. This option may advantageous in the case of the cooperation signal 20 comprising hard bits, which are subjected to selection combining in the cooperative signal communication process.

According to a further option, the combined received signal strength value $RSS_{calc}$ may be calculated according to:

$$RSS_{calc} = RSS_1 + RSS_2 \quad (2)$$

That is to say, the sum of individual received signal strength values is calculated. This option may advantageous in the case of the cooperation signal 20 comprising soft values of coded or uncoded bits, which are subjected to chase combining in the cooperative signal communication process.

According to some embodiments the first individual signal quality value Q1, the second individual signal quality value Q2, and the calculated signal quality value Q each correspond to a signal to interference plus noise ratio value. In this case, the signal quality value Q is a calculated signal to interference plus noise ratio value $SINR_{calc}$. Similarly, the first individual signal quality value Q1 is a first individual signal to interference plus noise ratio value $SINR_1$, and the second individual signal quality value Q2 is a second individual signal to interference plus noise ratio value $SINR_2$.

According to one option, the combined interference plus noise ratio value $SINR_{calc}$ may be calculated according to:

$$SINR_{calc} = \text{Max}(SINR_1, SINR_2). \quad (3)$$

That is to say, the maximum value of individual signal to noise plus interference values is selected. This option may advantageous in the case of the cooperation signal 20 comprising hard bits, which are subjected to selection combining in the cooperative signal communication process.

According to a further option, the combined received signal strength value $RSS_{calc}$ may be calculated according to:

$$SINR_{calc} = SINR_1 + SINR_2 \quad (4)$$

That is to say, the sum of the individual signal to interference plus noise values is calculated.

In units of dB this type of calculation may also be expressed as:

$$SINR_{calc}[dB] = 10\log(SINR_1 + SINR_2) \quad (5)$$

This option may advantageous in the case of the cooperation signal 20 comprising soft values of coded or uncoded bits, which are subjected to chase combining in the cooperative signal communication process.

According to some embodiments, the first individual signal quality value and the second individual signal quality value correspond to a received signal strength, and the calculated signal quality value corresponds to a signal to interference plus noise ratio value. In this case, the signal quality value Q is a calculated signal to interference plus noise ratio value $SINR_{calc}$. However, the first individual signal quality value Q1 is a first received signal strength value $RSS_1$, and the second individual signal quality value Q2 is a second individual received signal strength value $RSS_2$.

According to one option, the combined interference plus noise ratio value $SINR_{calc}$ may be calculated from a sum of the individual received signal strength values according to:

$$SINR_{calc} = (RSS_1 + RSS_2)/(\alpha I + N) \quad (6)$$

Here, I denotes an interference signal strength, N denotes a noise signal strength, and α denotes a parameter reflecting a receiver capability to suppress interference. For a receiver having an ideal interference suppression capability, i.e. all interference is suppressed, α has a value of zero. With decreasing interference suppression capability, α has a larger value and eventually approaches one, which corresponds to the case of no interference suppression. For example, in the case of advanced receiver algorithms, such as interference cancellation, α has a low value, e.g. between 0.1 and 0.3. Further, in the case of regular receiver algorithms, such as interference rejection combining, α may have a medium value, e.g. between 0.3 and 0.7. Further, in the case of simple receiver algorithms, such as maximum ratio combining, a may have a high value, e.g. between 0.7 and 0.9.

In units of dB this type of calculation may also be expressed as:

$$SINR_{calc}[dB] = 10\log((RSS_1 + RSS_2)/(\alpha I + N)). \quad (7)$$

This option may advantageous in the case of the cooperation signal 20 comprising samples of the Rx signal 10-2, e.g. IQ samples, and the cooperative signal communication process is based on advanced joint signal processing algorithms, e.g. interference cancellation.

According to some embodiments, the first individual signal quality value Q1, the second individual signal quality value Q2, and the calculated signal quality value Q each correspond to a residual block error value. In this case, the signal quality value Q is a calculated residual block error value $BLER_{calc}$. Similarly, the first individual signal quality value Q1 is a first individual residual block error value $BLER_1$, and the second individual signal quality value Q2 is a second individual residual block error value $BLER_2$.

According to one option, the combined residual block error value $BLER_{calc}$ may be calculated according to:

$$BLER_{calc} = \operatorname{Min}(BLER_1, BLER_2). \quad (8)$$

That is to say, the minimum value of the individual residual block error values is selected. This option may advantageous in the case of the cooperation signal 20 comprising hard bits, which are subjected to selection combining in the cooperative signal communication process.

According to some embodiments, the first individual signal quality value Q1, the second individual signal quality value Q2, and the calculated signal quality value Q each correspond to a channel frequency response function. In this case, the signal quality value Q is a calculated channel frequency response function $h_{calc}$. Similarly, the first individual signal quality value Q1 is a first individual channel frequency response function $h_1$, and the second individual signal quality value Q2 is a second individual channel frequency response function $h_2$.

According to one option, the combined channel frequency response function $h_{calc}$ may be calculated according to:

$$h_{calc} = \operatorname{Max}(h_1, h_2). \quad (9)$$

This option may advantageous in the case of the cooperation signal 20 comprising hard bits, which are subjected to selection combining in the cooperative signal communication process.

According to a further option, the combined channel frequency response function $h_{calc}$ may be calculated according to:

$$\|h_{calc}\|^2 = \|h_1\|^2 + \|h_2\|^2. \quad (10)$$

That is to say, an absolute value sum of the individual frequency response functions is calculated. This option may advantageous in the case of the cooperation signal 20 comprising soft values of coded or uncoded bits, which are subjected to chase combining in the cooperative signal communication process.

According to a still further option, the combined channel frequency response function $h_{calc}$ may be calculated according to:

$$h_{calc} = h_1 + h_2. \quad (11)$$

That is to say, the sum of the individual frequency response functions is calculated. This option may advantageous in the case of the cooperation signal 20 comprising samples of the Rx signal 10-2, e.g. IQ samples, and the cooperative signal communication process is based on advanced joint signal processing algorithms, e.g. including interference cancellation.

The calculated combined signal quality value Q, which may be frequency dependent, is then used as a basis for setting or adapting a transmission parameter 50 for future UL cooperative signal communication. This setting is accomplished by adaptation function P1-5 of the processing unit P1. The transmission parameter may be a modulation scheme, a coding scheme, a Tx power, and/or resource allocation to be used by the transmission unit R31 of the terminal 200 when transmitting the Tx signal which is cooperatively received by the serving access node 100-1 and the supporting access node 100-2.

In order to be available at the terminal 200 in the next cooperative transmission, the adapted transmission parameter is communicated from the serving access node 100-1 to the terminal 200, using the transmission unit T11 and the reception unit R31.

It is to be noted that the above approach of transmission parameter adaptation for UL cooperation is not limited to a single supporting access node. Rather, an arbitrary number of supporting access nodes may be involved. In this case the respective individual signal quality values would be obtained by each of the supporting access nodes, be collected at the serving access node, and used as a basis for calculating the combined signal quality value.

Further, it is to be noted that for accurately predicting the effects of cooperative signal communication, the cooperative signal communication does not need to be already established before or during the adaptation process. Rather, effects of future cooperation or of future changes in cooperation, e.g. the number of cooperating nodes, can be predicted and taken into account in the adaptation process.

According to some embodiments, the measurements of the individual signal quality values Q1, Q2 by the serving access node 100-1 and the supporting access node 100-2 are performed regularly and the latest measurements are used for setting the transmission parameter 50 for the next transmissions, assuming the characteristics of the communication links do not change significantly between two measurement points. A time interval between two measurements can be suitably selected or adjusted.

Figure 4:
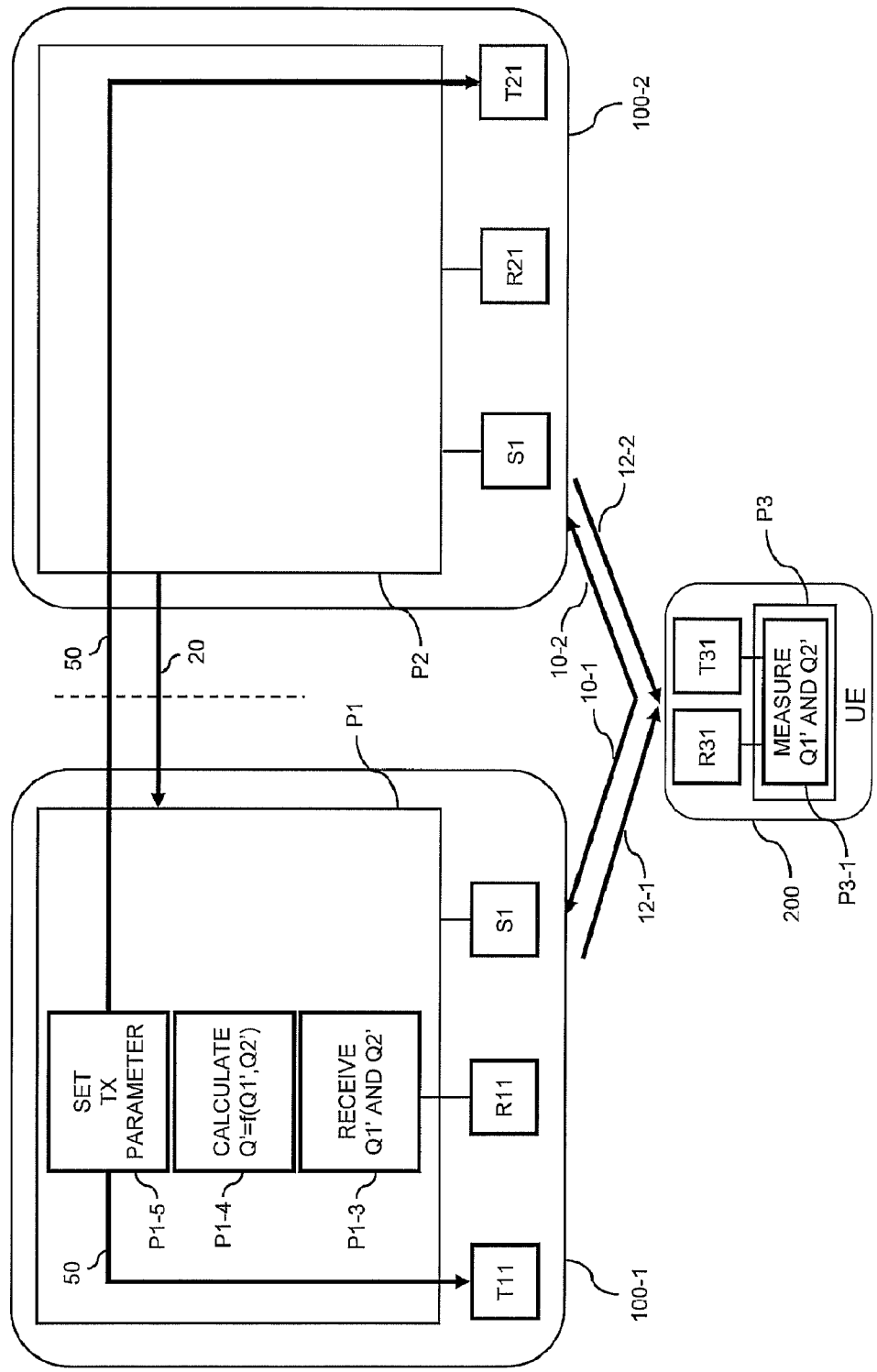
FIG. 4 schematically illustrates components in devices according to further embodiments of the invention.

FIG. 4 schematically illustrates devices for implementing transmission parameter adaptation according to an embodiment of the invention, which relates to transmission parameter adaptation for DL cooperative signal communication. In FIG. 4, elements which correspond to those as shown in FIGS. 1-3 have been designated with the same reference signs. Further details concerning these elements can thus be obtained from the corresponding explanations in connection with FIGS. 1-3. In FIG. 4 components and functions of the serving access node 100-1, of the supporting access node 100-2, and of the terminal 200 are further illustrated, which participate in a process of transmission parameter adaptation for DL cooperative signal communication according to an embodiment of the invention.

As already explained above, in DL cooperation, the transmission unit T11 of the serving access node 100-1 transmits the Tx signal 12-1, and the transmission unit T21 of the supporting BS 100-2 transmits the Tx signal 12-2. Further, in order to perform cooperative signal transmission, a cooperation signal 20 is communicated from the serving access node 100-1 to the supporting access node. The cooperation signal 20 may represent the Tx signal 12-2 to be cooperatively transmitted to the terminal in the form of samples, e.g. frequency domain IQ samples or time-domain samples. During cooperative signal communication, the Tx signal 12-1 and the Tx signal 12-2 are received as a single Rx signal at the terminal 200. However, for the purpose of individually characterizing the communication link between the serving access node 100-1 and the terminal 200, and the communication link between the supporting access node 100-2 and the terminal 200, the Tx signals 12-1 and 12-2 are individually received at the terminal 200, e.g. by transmitting the Tx signals 12-1, 12-2 for measurement purposes at different points of time.

In the processing unit P1 of the serving access node 100-1, a receiving function P1-3 is configured to receive a first individual signal quality value Q1' of the Tx signal 12-1 as received at the terminal 200 and a second individual signal quality value Q2' of the Tx signal 12-2 as received at the terminal 200. The individual signal quality values Q1', Q2' are received at the serving access node 100-1 using the wireless interface, i.e. the receiving unit R11. The individual signal quality values Q1', Q2' are measured by a measuring function P3-1 of the processing unit P3 in the terminal 200. The measured individual signal quality values Q1', Q2' are then transmitted to the serving access node 100-1 using the wireless interface, i.e. the transmission unit T31.

In the processing unit P1 of the serving access node 100-1, a calculating function P1-4 then calculates a signal quality value Q' which is a function f(Q1', Q2') of the first individual signal quality value Q1' and of the second individual signal quality value Q2'. In other words, the signal quality value Q' is calculated on the basis of the first individual signal quality value Q1' and on the basis of the second individual signal quality value Q2'. The signal quality value Q' may also be referred to as combined signal quality value.

Different ways are possible for calculating the combined signal value Q', which may be the same as mentioned in the case of UL cooperation for calculating the combined signal quality value Q.

The combined signal quality value Q' is then used as a basis for setting or adapting a transmission parameter 50 for future DL cooperative signal communication. This setting is accomplished by adaptation function P1-5' of the processing unit P1. The transmission parameter 50 may be a modulation scheme, a coding scheme, a Tx power, and/or resource allocation to be used by the transmission unit T11 of the serving access node 100-1, and by the transmission unit T21 of the supporting access node 100-2 when cooperatively transmitting the Tx signals 12-1, 12-2 to the terminal 200. For this purpose, the adapted transmission parameter 50 is communicated from the serving access node 100-1 to the supporting access node 100-2 using the transmission unit T21 and the reception unit R22.

According to some embodiments, the measurements of the individual signal quality values Q1', Q2' by the terminal 200 are performed regularly and the latest measurements are used for setting the transmission parameter 50 for the next transmissions, assuming the characteristics of the communication links do not change significantly between two measurement points. A time interval between two measurements can be suitably selected or adjusted.

It is to be noted that the above approach of transmission parameter adaptation for DL cooperation is not limited to a single supporting access node. Rather, an arbitrary number of supporting access nodes may be involved. In this case the respective individual signal quality values of a plurality of supporting access nodes would be obtained by the terminal 200 communicated to the serving access node 100-1, and used as a basis for calculating the combined signal quality value Q'.

Further, it is to be noted that for DL cooperation, there is also the possibility to measure a signal quality value of a single Rx signal received at the terminal 200, which is a superposition of the cooperatively transmitted Tx signals 12-1, 12-2. However, this approach may only be used for already established cooperative signal communication and is not suitable to predict effects of future changes in the type of cooperative signal communication, e.g. a change in the number of cooperating access nodes.

Figure 5:
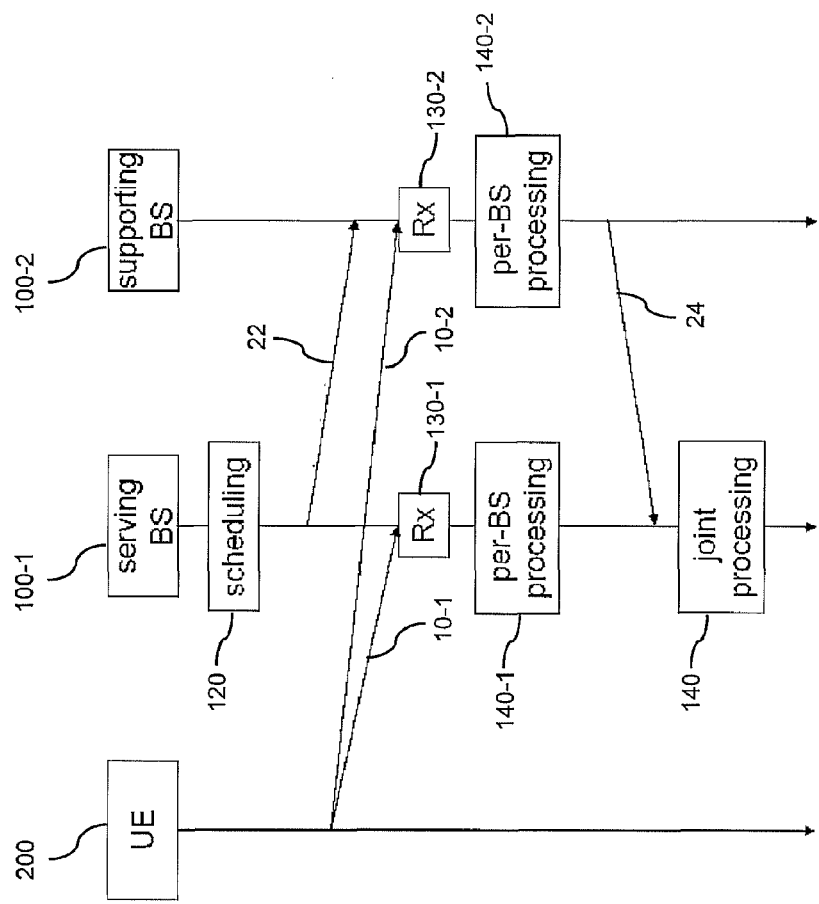
FIG. 5 schematically illustrates a process of UL cooperation according to an embodiment of the invention.

FIG. 5 schematically illustrates an example of a process of UL cooperation between the serving access node 100-1 and the supporting access node 100-2. As mentioned above, the serving access node 100-1 and the supporting access node 100-2 may be different BSs or different sections of the same BS. Again, it is to be understood that more than one supporting access node 100-2 could be provided.

The UE 200 is associated to the serving access node 100-1. The serving access node 100-1 controls the UE 200 and allocates resources for communication. This may be part of a scheduling step 120. The UE 200 has already been identified as a candidate for UL cooperation. Having allocated certain resource blocks (RBs) to the UE 200, the serving access node 100-1 make a request for support from the supporting access node 100-2 with respect to the particular UE 200, by sending a UL cooperation request message 22 to the supporting access node 100-2. The UL cooperation request 22 message can indicate which type of information relating to the Rx signal 10-2 is required, e.g., IQ samples, soft bits, hard bits. Furthermore, the UL cooperation request message 22 can comprise additional parameters which are required to deliver the requested Rx signal 10-2, e.g., time slots, transmission time intervals (TTIs), and RBs to be received, or parameters for interference cancellation at the supporting access node 100-2.

On the indicated RBs, the supporting access node 100-2 receives the Rx signal 10-2 from the UE 200, as indicated in reception step 130-2. The Rx signal 10-1 from the UE 200 is received at the serving access node 100-1 in reception step 130-1.

Depending on the requested type of information relating to the Rx signal, the supporting access node 100-2 might need to process the Rx signal 10-2 as received from the UE 200, as indicated by per-BS processing step 140-2. Typically, the processing on a per access node or per-BS basis in the supporting access node 100-2 will be similar to processing on a per-access node or per-BS basis in the serving access node 100-1, e.g. as performed in a per-BS processing step 140-1. For instance if decoded user data is requested, the supporting access node 100-2 demodulates and decodes the Rx signal 10-2 as received from the UE 200.

After per-access node processing the supporting access node 100-2 responds by sending a response message 24 with the requested information, i.e. the Rx signal 10-2 having the type as specified in the request, to the serving access node 100-1. Additionally, the supporting access node 100-2 can transmit parameters used by the serving access node 100-2, e.g. parameters used for interference cancellation at the serving access node 100-2.

Having received the requested information from the supporting access node 100-2, the serving access node 100-1 can jointly process the Rx signals received by itself and by the supporting access node 100-2. This is accomplished in a joint processing step 140. Depending on the type of the requested Rx signal 10-2, the serving access node 100-1 can, e.g., select the successfully coded bit stream, i.e. do selection combining, can do chase or soft combining of soft bits, or can do interference rejection combining or interference cancellation using IQ samples. As a result, the serving access node 100-1 determines an improved or optimized signal on the basis of the signals 10-1 and 10-2 received from the terminal 200.

In the above, the cooperation approach is outlined for only one supporting access node 100-2. If the serving access node 100-1 has identified multiple supporting access nodes, the presented approach is individually performed for each supporting access node. That is to say, the serving access node 100-1 requests cooperation from each supporting access node. The UL cooperation request messages 22 can be transmitted as unicast message, as multicast message or, depending on the circumstances, even as broadcast message. Each supporting access node responds with the requested information, i.e. the Rx signal having the type as specified in the request. Further, each supporting access node may cancel or disregard the request. Finally, the joint processing at the serving access node 100-1 combines and processes the Rx signals received at its own antennas and at the supporting nodes.

All parameters or information that are exchanged in the UL cooperation request message 22 or in the response message 24 may be compressed before the actual message exchange and decompressed after the actual message exchange. Here, it is to be noted that compression typically introduces additional time delay, which may be undesirable in some cases.

In the process of FIG. 5, cooperation is requested before the serving access node 100-1 performs processing of its own Rx signal 10-1 on a per-access node basis or per-BS basis, i.e. before the serving access node 100-1 receives the Rx signal 10-1. This approach may be referred to as a proactive approach. In an alternative approach, which may be referred to as a reactive approach, cooperation is requested after per-access node or per-BS processing at the serving access node 100-1, i.e. after the actual reception of the Rx signal 10-1 at the serving access node 100-1. This may be beneficial, e.g., if the serving access node's 100-1 own decoding attempt failed.

The process of cooperation as illustrated in FIG. 5 may be cancelled by both the supporting access node 100-1 and the serving access node 100-2. For instance, in the case of successful decoding at the serving access node 100-1 before the response 24 has been received, the serving access node 100-1 could send a cancel message to the supporting access node 100-2.

The request could be disregarded by the supporting access node 100-2 for several reasons. For example, the supporting access node 100-2 could simply ignore the request or it could send an implicit cancel message. The cancel message could contain the reason of cancellation. The supporting access node 100-2 could disregard the request in the case of, e.g. unsuccessful per-access node processing at the supporting access node 100-2 or saturation of backhaul capacity, i.e. a data traffic capacity available for transmitting data from the supporting access node 100-2 to the serving access node 100-1.

By means of the message exchange as described above it is even possible for the serving access node 100-1 to explicitly indicate under which circumstances the request should be disregarded. Several examples of such an indication are possible. According to one example, a signal is received at the supporting access node 100-2 with a higher quality if there are no simultaneous transmissions going on in the supporting access node's 100-2 cell. Thus, a serving access node 100-1 could request cooperation only if there are no simultaneous transmissions on the indicated RBs. This exception may be indicated in the UL cooperation request message 22 or may be pre-configured. According to a further example a priority could indicate how important or valuable the cooperative reception process is. For example, a "gold user" with an expensive subscription may get a higher priority than a best-effort user with a low cost subscription. In the case that the supporting access node 100-2 receives multiple requests which it cannot process, the supporting access node 100-2 may discard the requests with the lowest priorities.

The process as illustrated in FIG. 5 is based on a request-response mechanism, in which the serving access node 100-1 sends a request message 22 and the supporting access node responds 100-2 with a response message 24 including the requested information. In some embodiments, the request-response mechanism may be replaced by a subscribe-publish mechanism.

Figure 6:
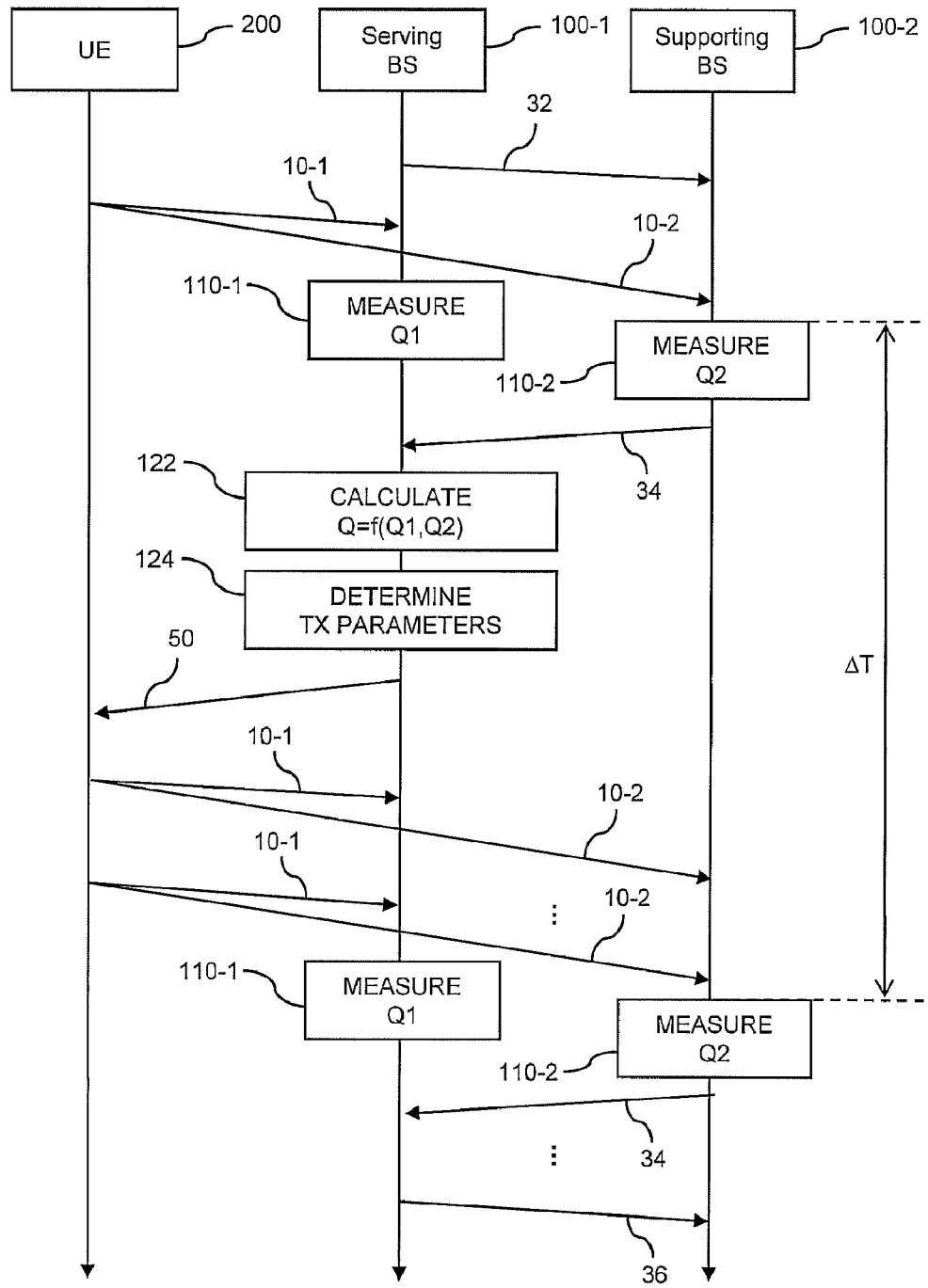
FIG. 6 schematically illustrates a process of transmission parameter adaptation in the process of FIG. 6.

FIG. 6 schematically illustrates an implementation of the process of transmission parameter adaptation for UL cooperation, which may be used in connection with the UL cooperation process of FIG. 5. The process of transmission parameter adaptation can be carried out at any suitable stage of UL cooperative signal communication, i.e. in an initial phase when establishing cooperative signal communication, e.g. before the scheduling step 110, or in an intermediate stage between two successive cooperative signal transmissions. In the latter case, if the adapted transmission parameter 50 requires new scheduling procedures, at least a part of the scheduling step 120 may be repeated after adapting the transmission parameter, e.g. for re-allocating RBs.

In the process of FIG. 6, the serving access node 100-1 sends a measurement request 32 to the supporting access node 100-2. According to some embodiments, the measurement request may be combined with the UL cooperation request 22 into a single request message.

At step 110-1, the serving access node measures the first signal quality value Q1 of the Rx signal 10-1. At step 110-2, the supporting access node measures the second signal quality value Q2 of the Rx signal 10-2. The measured second signal quality value Q2 is then communicated to the serving access node 100-1 in a measurement response message 34.

At step 122, the combined signal quality value Q is calculated on the basis of the first signal quality value Q1 and on the basis of the second signal quality value Q2. Exemplary ways of calculation have already been explained above.

At step 124, the transmission parameter 50 is set or adapted on the basis of the combined signal quality value. The transmission parameter 50 is then communicated to the UE 200 to be used for future cooperative transmissions.

The measurements of the individual signal quality values, i.e. measurement steps 110-1, 110-2, and subsequent adaptation of the transmission parameter 50, i.e. steps 122, 124, may be repeated at suitable time intervals, indicated by ΔT. The time interval ΔT may be indicated to the supporting access node 100-2 in the measurement request message 32 or may be configured in a different manner, e.g. by the O&M system. The repetition of the measurement step 120-2 at the supporting access node 100-2 may be cancelled in response to a measurement cancellation request 36 from the serving access node 100-1. The approach of repeated measurements in response to a single measurement request 32 may allow for reducing signalling required for implementing the transmission parameter adaptation. In some embodiments, there may also be a one-to-one relation between the measurement request 32 and measurement response 34, i.e. each measurement response 34 may require a respective measurement request 32. The latter approach may allow for a more flexible control of the transmission parameter adaptation process by the serving access node 100-1.

Figure 7:
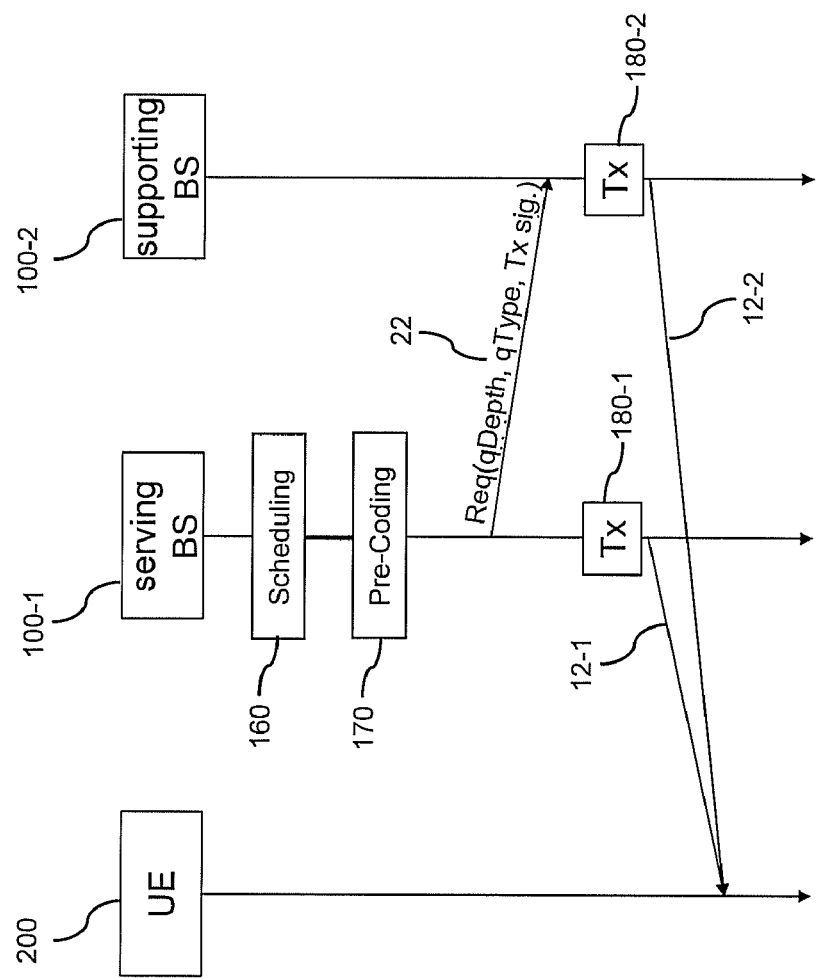
FIG. 7 schematically illustrates a process of DL cooperation according to an embodiment of the invention.

FIG. 7 schematically illustrates an example of a process of DL cooperation between a serving access node 100-1 and a supporting access node 100-2. As mentioned above, the serving access node 100-1 and the supporting access node 100-2 may be different BSs or different sections of the same BS. Again, it is to be understood that more than one supporting access node 100-2 could be provided.

The UE 200 is associated to the serving access node 100-1. The serving access node 100-1 controls the UE 200 and allocates resources for communication. This may be part of a scheduling step 160. The UE 200 has already been identified as a candidate for cooperation. Further, the serving access node 100-1 may perform joint processing in the form of pre-coding of the signal to be transmitted to the UE 200, as illustrated by pre-coding step 170. Having allocated certain resource blocks to the UE 200, the serving access node 100-1 make a request for DL support from the supporting access node 100-2 with respect to the particular UE 200, by sending a DL cooperation request message 22 to the supporting access node 100-2. The DL cooperation request message 22 comprises information relating to the Tx signal 12-2 to be transmitted from the supporting access node 100-2, e.g. frequency domain IQ samples or time domain samples of the Tx signal. Furthermore, the DL cooperation request message 22 can comprise parameters further characterizing the desired type of cooperation.

The supporting access node 100-2 receives the DL cooperation request 22 from the serving access node 100-1. The serving access node 100-1 and the supporting access node 100-2 may then cooperatively transmit the Tx signals 12-1 and 12-2 to the UE 200, as indicated by transmission steps 180-1 and 180-2, respectively.

In the above, the DL cooperation approach is outlined for only one supporting access node 100-2. If the serving access node 100-1 has identified multiple supporting access nodes, the presented approach is individually performed for each supporting access node. That is to say, the serving access node 100-1 requests DL cooperation from each supporting access node. The DL cooperation request messages 22 can be transmitted as unicast message, as multicast message or, depending on the circumstances, even as broadcast message.

All parameters or information that are exchanged in the DL cooperation request message 22, e.g. the information relating to the Tx signal 12-2, may be compressed before transmission of the DL cooperation request message 22 and decompressed after reception of the DL cooperation request message 22. Here, it is to be noted that compression typically introduces additional time delay, which may be undesirable in some cases.

Figure 8:
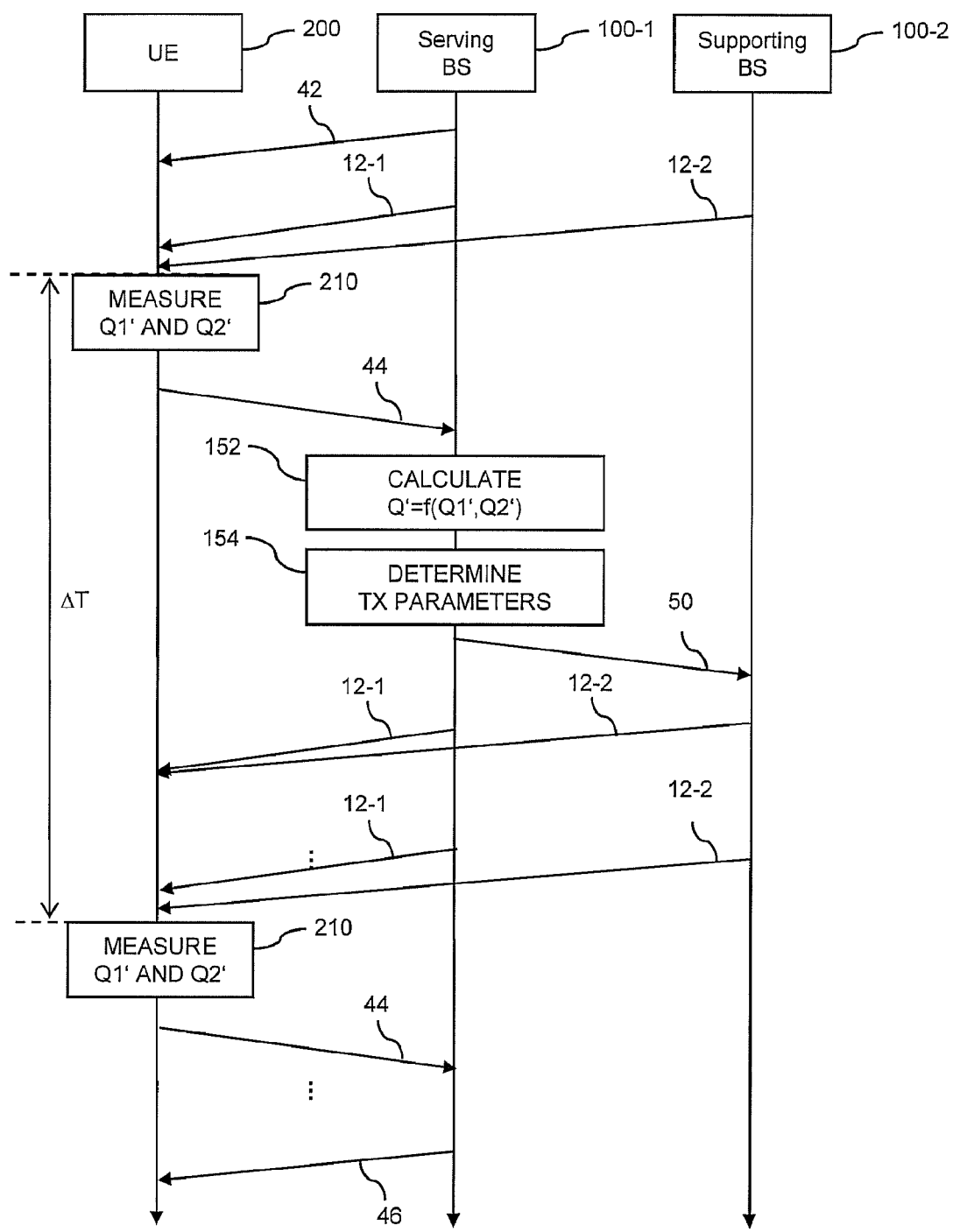
FIG. 8 schematically illustrates a process of transmission parameter adaptation in the process of FIG. 8.

FIG. 8 schematically illustrates an implementation of the process of transmission parameter adaptation for DL cooperation, which may be used in connection with the DL cooperation process of FIG. 7. The process of transmission parameter adaptation can be carried out at any suitable stage of DL cooperative signal communication, i.e. in an initial phase when establishing cooperative signal communication, e.g. before the scheduling step 160, or in an intermediate stage between two successive cooperative signal transmissions. In the latter case, if the adapted transmission parameter 50 requires new scheduling procedures, at least a part of the scheduling step 160 may be repeated after adapting the transmission parameter, e.g. for re-allocating RBs.

In the process of FIG. 8, the serving access node 100-1 sends a measurement request 42 to the UE 200. At step 210, the UE 200 measures the first signal quality value Q1', related to the Tx signal 12-1 as received by the UE 200, and the second signal quality value Q2', related to the Tx signal 12-2 as received by the UE 200. In this process, separate reception of the Tx signals 12-1, 12-2 is needed. For this purpose, the Tx signals 12-1, 12-2 may be separated in the time domain, in the frequency domain, and/or in the code domain. Accordingly, these signals are transmitted in a non-cooperative mode by the serving access node 100-1 and the supporting access node 100-1, e.g. as signals dedicated for measurement purposes or as a part of non-cooperative signal communication. The measured signal quality values Q1', Q2' are then communicated to the serving access node 100-1 in a measurement a measurement response message 44.

At step 152, the combined signal quality value Q' is calculated on the basis of the first signal quality value Q1' and on the basis of the second signal quality value Q2'. Exemplary ways of calculation have already been explained above. At step 154, the transmission parameter 50 is set or adapted on the basis of the combined signal quality value. The transmission parameter 50 is then communicated from the serving access node 100-1 to the supporting access node 100-2 to be used for future cooperative transmissions.

Also in this case, the measurements of the individual signal quality values Q1', Q2' and subsequent adaptation of the transmission parameter 50 may be repeated at suitable time intervals, indicated by $\Delta T$. The time interval $\Delta T$ may be indicated to the UE 200 in the measurement request message 42 or may be configured in a different manner, e.g. be pre-configured in the UE 200. The repetition of the measurement step 210 UE 200 may be cancelled in response to a measurement cancellation request 46 from the serving access node 100-1. The approach of repeated measurements in response to a single measurement request 42 may allow for reducing signalling required for implementing the transmission parameter adaptation. In some embodiments, there may also be a one-to-one relation between the measurement request 42 and measurement response 54, i.e. each measurement response 44 may require a respective measurement request 42. The latter approach may allow for a more flexible control of the transmission parameter adaptation process by the serving access node.

Figure 9:
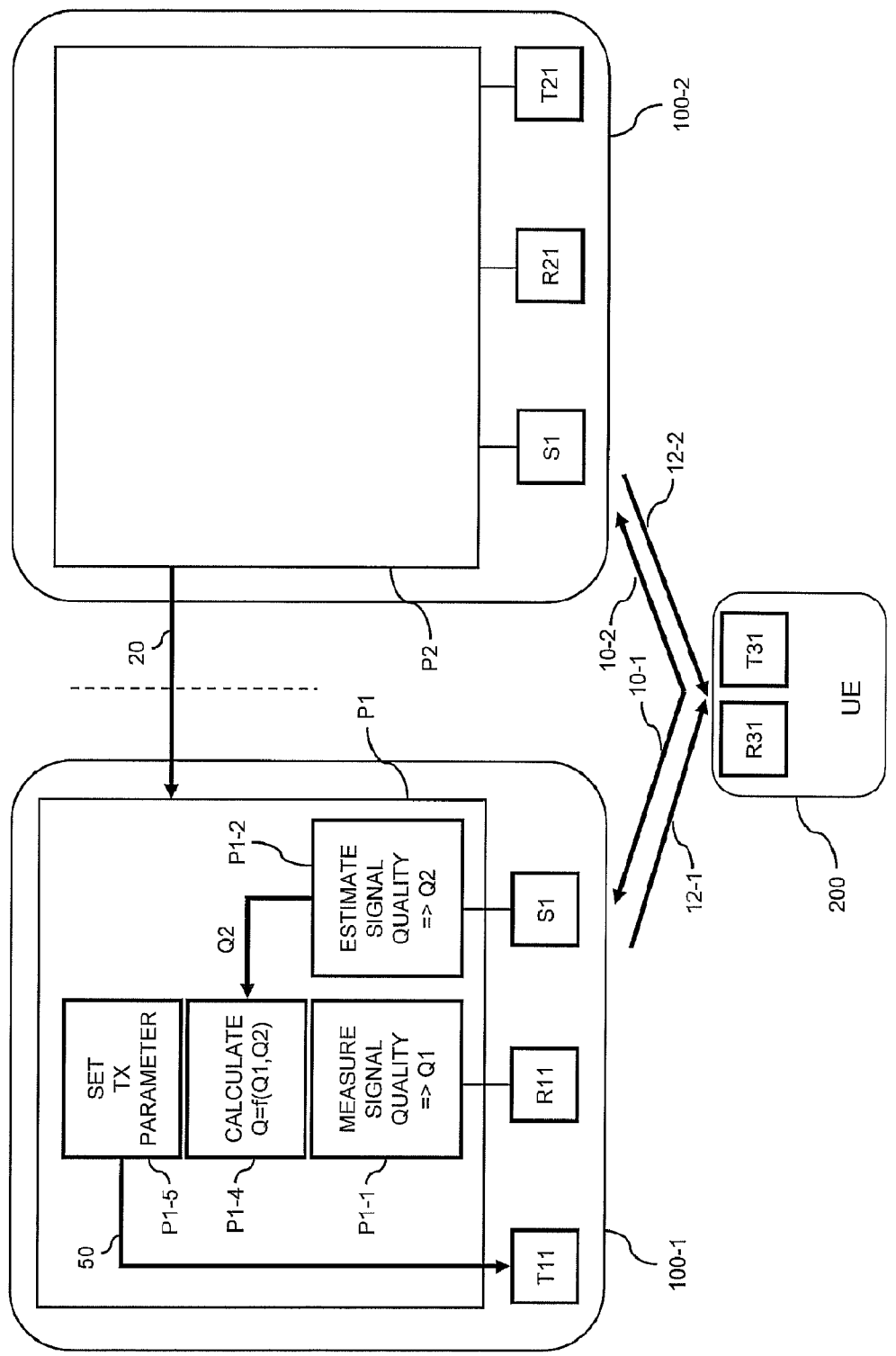
FIG. 9 schematically illustrates components in devices according to further embodiments of the invention.

FIG. 9 schematically illustrates devices to a further embodiment of the invention, which relates to transmission parameter adaptation for UL cooperative signal communication. In FIG. 9, elements which correspond to those as shown in FIGS. 1-3 have been designated with the same reference signs. Further details concerning these elements can thus be obtained from the corresponding explanations in connection with FIGS. 1-3. In FIG. 9 components and functions of the serving access node 100-1, of the supporting access node 100-2, and of the terminal 200 are further illustrated, which participate in a process of transmission parameter adaptation for UL cooperative signal communication according to an embodiment of the invention. As compared to the process of FIG. 3, the process of FIG. 9 is based on estimating the second individual signal quality value Q2 in the serving access node, rather than having the supporting access node 100-2 performing a measurement. This option may be advantageous if information from the supporting access node 100-2 is not available. This type of transmission parameter adaptation may also be referred to as open-loop transmission parameter adaptation. As compared to that, the above approaches according to FIGS. 2-8 may be referred to as closed-loop transmission parameter adaptation. Exemplary situations in which the open-loop transmission parameter adaptation may be applied are, e.g., before access node cooperation has started or when the serving access node 100-1 has not received the second signal quality value Q2 from the supporting access node 100-2.

In the open-loop transmission parameter adaptation process, the serving access node 100-1 measures the first individual signal quality value Q1 as explained in connection with FIG. 3. The second individual signal quality value Q2 may then be included into the calculation in the form of an expected increase in signal quality due to cooperation. The calculation function P1-4 and the adaptation function P1-5 are similar to FIG. 3.

The increase in signal quality due to cooperation between the serving access node and one or more supporting access nodes may be an increase in received signal strength, in the following referred to as $\Delta RSS$, or an increase in signal to interference plus noise ratio, in the following referred to as $\Delta SINR$. The increase in signal quality can be estimated as a function of one or more cooperation-specific parameters, which are known to the serving access node 100-1, e.g. stored in the storage unit S1. Examples of cooperation-specific parameters, which may be used alone or in combination for making the estimation, will be explained in the following.

According to one example, the cooperation-specific parameter is a difference between a first path gain $PG_1$ from the terminal 200 to the serving access node 100-1 and a second path gain $PG_2$ from the terminal 200 to the supporting access node 100-2. This difference, also referred to as path gain difference $\Delta PG=PG_1-PG_2$, may be known from mobility measurements reported by the terminal 200. Here, it is to be noted that although the path gain measured at the terminal is refers to DL, this path gain may be used for making an estimate for the UL situation since in typical cases a reciprocity between UL and DL can be assumed, i.e. characteristics of the UL communication link will be similar to characteristics of the DL communication link.

In a practical implementation, the terminal 200 may measure the received signal strength of the signal 12-2 from the supporting access node 100-2. Dividing the RSS by the Tx power used in the supporting access node 100-2, the terminal 200 may then obtain the path gain for the supporting access node 100-2. If the Tx power at the supporting access node is not available to the terminal 200, the terminal 200 may also report RSS measurements to the serving access node 100-1. In such situations, the serving access node may derive the path gain from the reported RSS value.

Further, by multiplying the path gain and the Tx power used by the terminal 200, the UL RSS can be estimated. Hence the difference in received signal strength $\Delta RSS$ can be used in the same way as the path gain difference $\Delta Pg$.

According to a further example, the cooperation-specific parameter may be a number of supporting access nodes for the terminal 200. This number is typically chosen by the serving access node 100-1.

According to a further example, the cooperation-specific parameter may be the type of UL cooperation, e.g., exchange of IQ samples, exchange of soft bits, exchange of hard bits. The type of cooperation is typically selected by the serving access node 100-1.

According to a further example, the cooperation-specific parameter may be the type of receiver algorithms used at the serving access node 100-1 and at the supporting access node 100-2, e.g. maximum ratio combining, interference rejection combining, interference cancellation. The serving access node 100-1 can explicitly ask the supporting access node 100-2 to use a specific type of receiver algorithm and will thus be aware of the performance which can be gained by using a specific type of receiver algorithm.

According to some embodiments, the process of open-loop transmission parameter adaptation is applied in a Time Division Duplex (TDD) system. In a TDD system, a rather strict reciprocity between UL and DL can be assumed, since an UL channel and a DL channel operate in the same frequency band.

The serving access node 100-1 can therefore request the terminal 200 to perform and report signal quality measurements on the DL channel from the supporting access node 100-2 to the terminal 200, i.e. to measure a signal quality value of the Tx signal 12-2 as received at the terminal 200. This value may then be used as an estimate for the corresponding UL signal quality value Q2. The combined signal quality value may then be calculated in the same ways as explained in connection with FIG. 3. Accordingly, a precise calculation of the combined signal quality value Q is possible, and due to the strict reciprocity of UL and DL in TDD systems, even frequency dependent signal quality values, like the improved channel frequency response function, can be obtained without requesting information from the supporting access node 100-2.

In the following, examples of estimating the increased signal to interference plus noise value due to cooperation between access nodes will be discussed in more detail.

When IQ samples, soft bits or hard bits are about to be exchanged between the serving access node 100-1 and the supporting access node 100-2, the increased SINR could be estimated based on the knowledge of the path gain $PG_2$ from the terminal 200 to the supporting access node 100-2, the measured received signal strength value of the signal 10-1, the Tx power $P_{UE}$ used by the terminal 200 and the measured interference $I_1$ in the Rx signal 10-1 received at the serving access node 100-1.

According to one option, the combined signal quality value Q can be calculated as an estimate of the increased SINR according to:

$$SINR_{calc} = \frac{RSS_1 + P_{UE} PG_2}{\alpha I_1 + N}. \quad (12)$$

Here, $\alpha$ is the above-defined parameter for reflecting the receiver capability to suppress interference, $I_1$ is the interference signal strength at the serving access node 100-1, and N is the noise signal strength.

That is to say, in this case the first individual signal quality Q value is a measured received signal strength value and the second individual signal quality Q2 value is an estimated received signal strength value given by:

$$RSS_2 = P_{UE} PG_2 \quad (13)$$

The above calculations can be generalized to an arbitrary number M of supporting access nodes having respective path gains $PG_2, \ldots, PG_M$, yielding:

$$SINR_{calc} = \frac{RSS_1 + P_{UE} \sum_{i=2}^{M} PG_i}{\alpha(1 + M\beta)I_1 + N}. \quad (14)$$

Here, $\beta$ is a parameter which reflects the higher interference level contained in the Rx signal received at the supporting access nodes as compared to the Rx signal at the serving access node 100-1. Typically, $\beta > 1$. Other co-channel terminals are received with higher strength at supporting access nodes and act as strong interferers for the supported terminal 200.

This option is advantageous when the cooperative reception is based on communicating samples of the Rx signals received at the supporting access nodes.

According to a further option, the combined signal quality value Q can be calculated as an estimate of the increased SINR according to:

$$SINR_{calc} = \frac{RSS_1}{\alpha \cdot I_1} + \frac{P_{UE} \cdot PG_2}{\alpha_i \cdot I_1 + N} \quad (15)$$

Here, $\alpha_i$ is the above-defined factor for reflecting the receiver capability of the supporting access node with index i to suppress interference.

This calculation can be generalized to an arbitrary number M of supporting access nodes having respective path gains $PG_2, \ldots, PG_M$, yielding:

$$SINR_{calc} = \frac{RSS_1}{\alpha \cdot I_1} + P_{UE} \cdot \sum_{i=2}^{M} \frac{PG_i}{\alpha_i \cdot \beta \cdot I_1 + N} \quad (16)$$

This option is advantageous when the cooperative reception is based on communicating soft bits of the Rx signals received at the supporting access nodes.

According to a still further option, the combined signal quality value Q can be calculated as an estimate of the increased SINR according to:

$$SINR_{calc} = \text{Max}\left(\frac{RSS_1}{\alpha_1 \cdot I_1}, \frac{P_{UE} \cdot PG_2}{\alpha_2 \cdot I_1 + N}\right) \quad (17)$$

This calculation can be generalized to an arbitrary number M of supporting access nodes having respective path gains $PG_2, \ldots, PG_M$, yielding:

$$SINR_{calc} = \text{Max}_{i=2\ldots M}\left(\frac{RSS_1}{\alpha_1 \cdot I_1}, \frac{P_{UE} \cdot PG_i}{\alpha_i \cdot \beta \cdot I_1 + N}\right) \quad (18)$$

This option is advantageous when the cooperative reception is based on communicating hard bits of the Rx signals received at the supporting access nodes.

According to other examples, a combine received signal strength value can be calculated in accordance with the calculation options as mentioned in connection with FIG. 3, assuming that the second signal quality value Q2 is a received signal strength value $RSS_2$ estimated according to Eq. 13.

According to further examples, the increase in SINR due to cooperation can be estimated on the basis of a look-up table stored in the storage S1 of the serving access node 100-1. An example of a look-up table to be used in the case of cooperative signal communication on the basis of soft bits is shown in FIG. 10. An example of a look-up table to be used in the case of cooperative signal communication on the basis of hard bits is shown in FIG. 11. In these tables, the increase in signal to interference plus noise ratio ΔSINR is given depending on the receiver type at supporting access node 100-2 and the path gain difference ΔPG.

Similarly, the increase in received signal strength, or the reduction of residual block error value could be estimated on the basis of a look-up table stored in the memory of the serving access node 100-1. Here, it is to be understood that the performance of cooperation between access nodes depends on the type of exchanged information, i.e. the type of communicated cooperation signals. Therefore, it may be advantageous to use a look-up table which is tailored for a specific type of cooperation or to use different look-up tables for different types of cooperation. This is exemplified by the tables of FIGS. 10 and 11. In some embodiments, different look-up tables may be provided for different supporting access nodes.

The look-up table can be previously obtained by simulations or measurements. Its entries may be the receiver interference suppression algorithm at the supporting access node BS 100-1 and the path gain difference ΔPG. The look-up table could also be updated during operation, e.g. based on measurements.

For each supporting access node, e.g. the supporting access node 100-2, the serving access node may select ΔSINR from the respective look-up table, which is then used as second individual signal quality value for calculating the combined signal quality value Q.

According to one option, this may be accomplished according to:

$$SINR_{Calc} = SINR_1 + \Delta SINR. \quad (19)$$

For an arbitrary number M of supporting access nodes, denoted by index i, with respective look-up tables for the respective increase in signal to interference plus noise ratio ΔSINR, this calculation may be generalized to:

$$SINR_{calc} = SINR_1 + \Sigma_{i=2}^{M} \Delta SINR_i. \quad (20)$$

This option is advantageous when the cooperative reception is based on communicating soft bits of the Rx signals received at the supporting access nodes.

According to a further option, the combined signal quality value Q for an arbitrary number M of supporting access nodes may be calculated according to:

$$SINR_{calc} = SINR_1 + \text{Max}_{i=2\ldots M}(\Delta SINR_i) \quad (21)$$

This option is advantageous when the cooperative reception is based on communicating hard bits of the Rx signals received at the supporting access nodes. It should be noted that in the case of only one supporting access node, the latter two options are equivalent and correspond to the calculation according to Eq. 20.

Figure 12:
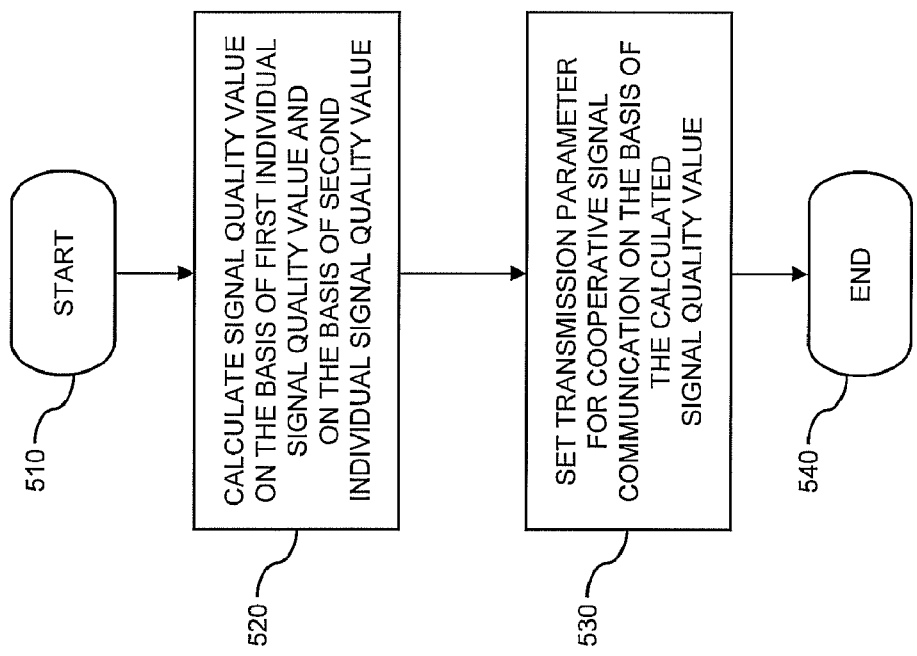
FIG. 12 shows a flowchart for illustrating a method according to an embodiment of the invention.

FIG. 12 shows a flowchart for illustrating a method in accordance with the concepts as explained above.

The method starts at step 510.

At step 520, the combined signal quality value is calculated. This may be accomplished on the basis of measured individual signal quality values. Alternatively, only a signal quality value of the communication link between the serving access node and the terminal may be measured, and at least one further individual signal quality value may be estimated, e.g. on the basis of stored information.

At step 530, the transmission parameter, e.g. a modulation scheme, a coding scheme, a transmit power, and/or a resource allocation, is set or adapted on the basis of the calculated combined signal quality value. The transmission parameter may then be used for future cooperative signal transmissions.

The method ends at step 530.

According to the concepts of the embodiments and examples as explained above, cooperation-specific parameters are considered when adjusting the link adaptation algorithms to the approach of cooperation chosen by the serving BS. The concepts allow for efficiently exploiting the potential of cooperative signal communication, which may in turn be used to improve communication performance with respect to a cell of a communication network or with respect to a specific terminal.

It is to be understood that the above concepts, examples and embodiments are merely illustrative and are susceptible to various modifications. For example, in the above-described methods and processes, steps or procedures may be executed according to the order as described or in a different order. Further, it is also possible to omit certain steps or procedures without departing from the scope of the present disclosure. Moreover, individual features of different examples or embodiments may be combined with each other as appropriate. For example, aspects of open-loop transmission parameter adaptation may be combined with the transmission parameter adaptation processes involving a measurement of the signal quality value pertaining to the communication link between the supporting access node and the terminal. Further, aspects of open-loop transmission parameter adaptation may also be applied to DL cooperative signal communication. Further, although the above examples refer to situations in the adaptation process is implemented substantially in the serving access node, other embodiments have the adaptation process implanted by a central node communicating with the serving access node and the supporting access node or may use a an adaptation process which is distributed between different devices, e.g. the serving access node, the supporting access node, and/or the terminal. In addition, it is to be understood that procedures or functions as described herein may be implemented by dedicated hardware or by software comprising a program code to be executed by a processor.

The invention claimed is:

1. A method of cooperative signal communication, comprising:
    calculating a signal quality value ($Q_{calc}$) based on a first individual signal quality value ($Q_1$) of a first communication link between a first access node and a mobile terminal and based on a second individual signal quality value ($Q_2$) of a second communication link between a second access node and the mobile terminal, wherein the first and second communication links are different; and
    setting, based on the $Q_{calc}$, a transmission parameter for cooperative communication of a signal between the mobile terminal and the first and second access nodes;
    wherein the $Q_1$ the $Q_2$, and the $Q_{calc}$ each correspond to:
        a signal to interference plus noise ratio (SINR) value,
        a received signal strength (RSS) value, or
        a channel frequency response function; and
    wherein said calculating comprises calculating the $Q_{calc}$, according to:

$$Q_{calc} = \text{Max}(Q_1, Q_2) \text{ or}$$

$$Q_{calc} = Q_1 + Q_2.$$

2. The method according to claim 1, wherein the transmission parameter comprises at least one of a modulation scheme and a coding scheme.

3. The method according to claim 1, wherein the transmission parameter comprises a transmission power.

4. The method according to claim 1, wherein the transmission parameter comprises a resource allocation.

5. The method according to claim 1, wherein the method is performed by the first access node and further comprises receiving at least one of the $Q_1$ and the $Q_2$ from either the second access node or the mobile terminal.

6. The method according to claim 1, wherein the method is performed by the first access node and further comprises estimating the $Q_2$ based on at least one cooperation-specific parameter available to the first access node.

7. The method according to claim 6, wherein the at least one cooperation-specific parameter is at least one of:
    a difference between a path gain of the first communication link and a path gain of the second communication link,
    a transmit power of the mobile terminal,
    a transmit power of the first access node,
    a transmit power of the second access node,
    a number of cooperating access nodes for the mobile terminal,
    a type of cooperative signal communication, or
    a type of receiver algorithm used at the first access node, the second access node, or the mobile terminal.

8. The method according to claim 1, wherein the $Q_1$, the $Q_2$, and the $Q_{calc}$ each correspond to a received signal strength value.

9. The method according to claim 8, wherein said calculating comprises calculating the $Q_{calc}$, denoted by $RSS_{calc}$, from the $Q_1$, denoted by $RSS_1$, and the $Q_2$, denoted by $RSS_2$, according to:

$$RSS_{calc} = Max(RSS_1, RSS_2).$$

10. The method according to claim 8, wherein said calculating comprises calculating the $Q_{calc}$, denoted by $RSS_{calc}$, from the $Q_1$, denoted by $RSS_1$, and the $Q_2$, denoted by $RSS_2$, according to:

$$RSS_{calc} = RSS_1 + RSS_2.$$

11. The method according to claim 1, wherein the $Q_1$, the $Q_2$, and the $Q_{calc}$ each correspond to a signal to interference plus noise ratio value.

12. The method according to claim 11, wherein said calculating comprises calculating the $Q_{calc}$, denoted by $SINR_{calc}$, from the $Q_1$, denoted by $SINR_1$, and the $Q_2$, denoted by $SINR_2$, according to:

$$SINR_{calc} = Max(SINR_1, SINR_2).$$

13. The method according to claim 11, wherein said calculating comprises calculating the $Q_{calc}$, denoted by $SINR_{calc}$, from the $Q_1$, denoted by $SINR_1$, and the $Q_2$, denoted by $SINR_2$, according to:

$$SINR_{calc} = SINR_1 + SINR_2.$$

14. The method according to claim 1, wherein the $Q_1$, the $Q_2$, and the $Q_{calc}$ correspond to a channel frequency response function.

15. The method according to claim 14, wherein said calculating comprises calculating the $Q_{calc}$, denoted by $h_{calc}$, from the $Q_1$, denoted by $h_1$, and the $Q_2$, denoted by $h_2$, according to:

$$h_{calc} = Max(h_1, h_2).$$

16. The method according to claim 14, wherein said calculating comprises calculating the $Q_{calc}$, denoted by $h_{calc}$, from the $Q_1$, denoted by $h_1$, and the $Q_2$, denoted by $h_2$, according to:

$$h_{calc} = h_1 + h_2.$$

17. The method of claim 1, wherein said setting comprises setting a transmission parameter that governs transmission of the signal by the mobile terminal to the first and second access nodes or transmission of the signal by the first and second access nodes to the mobile terminal.

18. A device comprising one or more interfaces, a processor, and a memory, the memory containing instructions executable by the processor whereby the device is configured to:
  calculate a signal quality value ($Q_{calc}$) based on a first individual signal quality value ($Q_1$) of a first communication link between a first access node and a mobile terminal and based on a second individual signal quality value ($Q_2$) of a second communication link between a second access node and the mobile terminal, wherein the first and second communication links are different; and
  set, based on the $Q_{calc}$, a transmission parameter for cooperative communication of a signal between the mobile terminal and the first and second access nodes;
  wherein the $Q_1$ the $Q_2$, and the $Q_{calc}$ each correspond to:
    a signal to interference plus noise ratio (SINR) value,
    a received signal strength (RSS) value, or
    a channel frequency response function; and
  wherein the device is configured to calculate the $Q_{calc}$, according to:

$$Q_{calc} = Max(Q_1, Q_2) \text{ or}$$

$$Q_{calc} = Q_1 + Q_2.$$

19. The device according to claim 18, wherein the device is configured to operate as the first access node.

20. The device according to claim 18, wherein the transmission parameter comprises at least one of a modulation scheme and a coding scheme.

21. The device according to claim 18, wherein the transmission parameter comprises a transmission power.

22. The device according to claim 18, wherein the transmission parameter comprises a resource allocation.

23. The device according to claim 18, wherein the memory contains instructions executable by the processor whereby the device is configured to receive, via the one or more interfaces, at least one of the $Q_1$ and the $Q_2$ from either the second access node or the mobile terminal.

24. The device according to claim 18, wherein the memory contains instructions executable by the processor whereby the device is further configured to estimate the $Q_2$ based on at least one cooperation-specific parameter available to the first access node.

25. The device according to claim 18, wherein the at least one cooperation-specific parameter is at least one of:
  a difference between a path gain of the first communication link and a path gain of the second communication link,
  a transmit power of the mobile terminal,
  a transmit power of the first access node,
  a transmit power of the second access node,
  a number of cooperating access nodes for the mobile terminal,
  a type of cooperative signal communication, or
  a type of receiver algorithm used at the first access node, the second access node, or the mobile terminal.

26. The device according to claim 18, wherein the $Q_1$, the $Q_2$, and the $Q_{calc}$ each correspond to a received signal strength value.

27. The device according to claim 26, wherein the processor is configured to calculate the $Q_{calc}$, denoted by $RSS_{calc}$, from the $Q_1$, denoted by $RSS_1$, and the $Q_2$, denoted by $RSS_2$, according to:

$$RSS_{calc} = Max(RSS_1, RSS_2).$$

28. The device according to claim 26, wherein the processor is configured to calculate the $Q_{calc}$, denoted by $RSS_{calc}$, from the $Q_1$, denoted by $RSS_1$, and the $Q_2$, denoted by $RSS_2$, according to:

$$RSS_{calc} = RSS_1 + RSS_2.$$

29. The device according to claim 18, wherein the $Q_1$, the $Q_2$, and the $Q_{calc}$ each correspond to a signal to interference plus noise ratio value.

30. The device according to claim 29, wherein the processor is configured to calculate the $Q_{calc}$, denoted by $SINR_{calc}$, from the $Q_1$, denoted by $SINR_1$, and the $Q_2$, denoted by $SINR_2$, according to:

$$SINR_{calc} = Max(SINR_1, SINR_2).$$

31. The device according to claim 29, wherein the processor is configured to calculate the $Q_{calc}$, denoted by $SINR_{calc}$, from the $Q_1$, denoted by $SINR_1$, and the $Q_2$, denoted by $SINR_2$, according to:

$$SINR_{calc}=SINR_1+SINR_2.$$

32. The device according to claim 18, wherein the $Q_1$, the $Q_2$, and the $Q_{calc}$ correspond to a channel frequency response function.

33. The device according to claim 21, wherein the processor is configured to calculate the $Q_{calc}$, denoted by $h_{calc}$, from the $Q_1$, denoted by $h_1$, and the $Q_2$, denoted by $h_2$, according to:

$$h_{calc}=\text{Max}(h_1,h_2).$$

34. The device according to claim 32, wherein the processor is configured to calculate the $Q_{calc}$, denoted by $h_{calc}$, from the $Q_1$, denoted by $h_1$, and the $Q_2$, denoted by $h_2$, according to:

$$h_{calc}=h_1+h_2.$$

35. A network system, comprising:
a first access node comprising a wireless interface configured to communicate with a mobile terminal on a first communication link; and
a second access node comprising a wireless interface configured to communicate with the mobile terminal on a second communication link,
wherein the first access node further comprises a processor and a memory, the memory containing instructions executable by the processor whereby the first access node is configured to calculate a signal quality value ($Q_{calc}$) based on a first individual signal quality value ($Q_1$) of the first communication link and based on a second individual signal quality value ($Q_2$) of the second communication link, and to set, based on the $Q_{calc}$, a transmission parameter for cooperative communication of a signal between the mobile terminal and the first and second access nodes;
wherein the $Q_1$, and $Q_2$, the $Q_{calc}$ each correspond to:
a signal to interference plus noise ratio (SINR) value,
a received signal strength (RSS) value or
a channel frequency response function; and
wherein the first access node is configured to calculate the $Q_{calc}$ according to:

$$Q_{calc}=\text{Max}(Q_1,Q_2) \text{ or}$$

$$Q_{calc}=Q_1+Q_2.$$

36. A computer program product stored on a non-transitory computer-readable medium and comprising computer program code that, when executed by a processor of a network device, cause the network device to:
calculate a signal quality value ($Q_{calc}$) based on a first individual signal quality value ($Q_1$) of a first communication link between a first access node and a mobile terminal and based on a second individual signal quality value ($Q_2$) of a second communication link between a second access node and the mobile terminal; and
set, based on the ($Q_{calc}$) calculated signal quality value, a transmission parameter for cooperative communication of a signal between the mobile terminal and the first and second access nodes;
wherein the $Q_1$, the $Q_2$, and the $Q_{calc}$ each correspond to:
a signal to interference plus noise ratio (SINR) value,
a received signal strength (RSS) value, or
a channel frequency response function; and
wherein the network device is caused to calculate the $Q_{calc}$ according to:

$$Q_{calc}=\text{Max}(Q_1,Q_2) \text{ or}$$

$$Q_{calc}=Q_1+Q_2.$$

* * * * *